(12) United States Patent
Kolich et al.

(10) Patent No.: US 7,632,893 B2
(45) Date of Patent: *Dec. 15, 2009

(54) BROMINATED STYRENIC POLYMERS AND THEIR PREPARATION

(75) Inventors: Charles H. Kolich, Baton Rouge, LA (US); Jeffrey Todd Aplin, Baton Rouge, LA (US); John F. Balhoff, Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 411 days.

This patent is subject to a terminal disclaimer.

(21) Appl. No.: 11/453,542

(22) Filed: Jun. 14, 2006

(65) Prior Publication Data

US 2007/0004870 A1 Jan. 4, 2007

Related U.S. Application Data

(60) Provisional application No. 60/696,468, filed on Jun. 30, 2005, provisional application No. 60/790,431, filed on Apr. 6, 2006.

(51) Int. Cl.
*C08F 12/08* (2006.01)

(52) U.S. Cl. ............... 525/333.3; 525/333.4; 525/356; 525/357; 525/370; 526/346

(58) Field of Classification Search ............ 525/333.3, 525/333.4, 356, 357, 370, 371, 359.2, 359.3, 525/359.4, 359.5, 359.6
See application file for complete search history.

(56) References Cited

U.S. PATENT DOCUMENTS

| | | | |
|---|---|---|---|
| 2,513,330 A | 7/1950 | Kaganoff | |
| 2,519,034 A | 8/1950 | Elmore et al. | |
| 3,009,906 A | 11/1961 | Eichhorn et al. | |
| 3,039,977 A | 6/1962 | Ingram | |
| 3,050,476 A | 8/1962 | Tress et al. | |
| 3,506,741 A | 4/1970 | Trepka et al. | |
| 3,959,398 A | 5/1976 | Jalics | |
| 4,074,032 A | 2/1978 | Naarmann et al. | |
| 4,143,221 A | 3/1979 | Naarmann et al. | |
| 4,162,233 A | 7/1979 | Kramer | |
| 4,200,703 A | 4/1980 | Diebel et al. | |
| 4,284,818 A | 8/1981 | Sato et al. | |
| 4,352,909 A | 10/1982 | Barda et al. | |
| 4,360,455 A | 11/1982 | Lindenschmidt et al. | |
| 4,501,859 A | 2/1985 | Newman et al. | |
| 4,513,116 A | 4/1985 | Kowalski et al. | |
| 4,548,995 A | 10/1985 | Kowalski et al. | |
| 4,554,326 A | 11/1985 | Kowalski et al. | |
| 4,650,832 A | 3/1987 | Kowalski et al. | |
| 4,877,912 A | 10/1989 | Frank | |
| 4,879,353 A | 11/1989 | Sanders et al. | |
| 4,975,496 A | 12/1990 | Tigner et al. | |
| 5,532,322 A | 7/1996 | Kadono et al. | |
| 5,677,390 A | 10/1997 | Dadgar et al. | |
| 5,686,538 A | 11/1997 | Balhoff et al. | |
| 5,741,949 A * | 4/1998 | Mack | 568/639 |
| 5,767,203 A | 6/1998 | Ao et al. | |
| 5,852,131 A | 12/1998 | Balhoff et al. | |
| 5,852,132 A | 12/1998 | Dadgar et al. | |
| 5,916,978 A | 6/1999 | Ao et al. | |
| 6,133,381 A | 10/2000 | Reed et al. | |
| 6,207,765 B1 | 3/2001 | Ao et al. | |
| 6,232,393 B1 | 5/2001 | Dadgar et al. | |
| 6,232,408 B1 | 5/2001 | Dadgar et al. | |
| 6,235,831 B1 | 5/2001 | Reed et al. | |
| 6,235,844 B1 | 5/2001 | Dadgar et al. | |
| 6,326,439 B1 | 12/2001 | Dadgar et al. | |
| 6,521,714 B2 * | 2/2003 | Kolich et al. | 525/333.4 |
| 6,657,028 B1 | 12/2003 | Aplin et al. | |

FOREIGN PATENT DOCUMENTS

| | | |
|---|---|---|
| CA | 1124947 | 6/1982 |
| EP | 0201411 | 11/1986 |
| GB | 841946 | 7/1960 |
| GB | 953484 | 3/1964 |
| GB | 968705 | 9/1964 |
| GB | 1426838 | 3/1976 |
| JP | 59102903 | 6/1984 |

(Continued)

OTHER PUBLICATIONS

Bachman et al., "A New Method of Preparing Substituted Vinyl Compounds. Depolymerization Studies On Vinyl Polymers", Journal of Organic Chemistry, pp. 108-121.

(Continued)

*Primary Examiner*—Vasu Jagannathan
*Assistant Examiner*—Robert C Boyle
(74) *Attorney, Agent, or Firm*—Jeremy J. Kliebert

(57) ABSTRACT

Preparing brominated styrenic polymer by maintaining a mixture formed from (i) brominating agent, (ii) a solvent solution of styrenic polymer, and (iii) aluminum halide catalyst, at −20 to +20° C., and terminating bromination in 20 minutes or less. New brominated anionic styrenic polymers have better melt flow and/or lower initial ΔE values than the best previously-known brominated anionic styrenic polymers. Other features of such new polymers include high thermal stabilities at 320° C. and/or very low initial color values. Brominated styrenic polymers, especially brominated anionic styrenic polymers, are useful as flame retardants for thermoplastic polymers.

28 Claims, No Drawings

FOREIGN PATENT DOCUMENTS

| | | |
|---|---|---|
| JP | 2215807 | 8/1990 |
| JP | 06322023 | 5/1993 |
| JP | 05239326 | 9/1993 |
| JP | 5287014 | 11/1993 |
| JP | 6322022 | 11/1994 |
| JP | 7002930 | 1/1995 |
| JP | 07018165 | 1/1995 |
| JP | 07126320 | 5/1995 |
| JP | 07126463 | 5/1995 |
| JP | 8053511 | 2/1996 |
| JP | 08188622 | 7/1996 |
| JP | 9221574 | 8/1997 |
| JP | 09227625 | 9/1997 |
| JP | 10130325 | 5/1998 |
| JP | 10158327 | 6/1998 |
| JP | 10195133 | 7/1998 |
| JP | 11043511 | 2/1999 |
| JP | 2000248018 | 9/2000 |
| JP | 2000248021 | 9/2000 |
| JP | 2000281800 | 10/2000 |
| WO | WO 9813396 | 4/1998 |
| WO | WO 9925746 | 5/1999 |

OTHER PUBLICATIONS

Caplus Abstract No. 136:47322; Cerny, et al., "Multinuclear NMR Studies of Mixtures of Aluminum and Gallium Trihalides in Benzene", Journal of the Chemical Society (2001), (18) 2690-2703.

Caplus Abstract No. 100:218068; Dhanalakshmi, et al., "Molecular Constants of Aluminum Bromide Dichloride (AlCl2Br) and Aluminum Chloride Dibromide (AlBr2Cl)", India Acta Clencia Indica, Physics (1983), 9(1-4), 1-4.

Caplus Abstract No. 137:319495; Himmel, et al., "Matrix Reactivity of AlF and AlCl in the Presence of Hcl and HBr: Generation and Characterization of the New Al (III) Hydrides HalFCl, HalFBr, and HalClBr and the Monomeric Mixed Al(III) Halides AlX2Y (X, Y=F, Cl, or Br)", Inorganic Chemistry (2002), vol. 41(19), pp. 4952-4960.

Caplus Abstract No. 111:143000; Mohan, et al., "Vibrational Analysis of Aluminum Mixed Halides", Acta Ciencia Indica, Physics (1988) vol. 14(3), pp. 125-134.

Caplus Abstract No. 97:135910; Natarajan, et.al, "Molecular Constants of Aluminum Bromide Dichloride (AlCl2Br) and Aluminum Chloride Dibromide (AlClBr2)", Indian Journal of Pure and Applied Physics (1982), vol. 20(6), pp. 498-499.

Caplus Abstract No. 129:307171; Petrie, Simon, "Thermochemistry of Aluminum Halides: A Theoretical Appraisal", Journal of Physical Chemistry A (1998), vol. 102(40), pp. 7828-7834.

Caplus Abstract No. 122:264719; Rostovshehikova, et al., "Catalytic Activity of Complexes of Aluminum Halide in Solid-Phase Hydrochlorination of Ethylene", Kinetics and Catalysts (1995) vol. 36(1), pp. 137-141.

Caplus Abstract No. 123:111349; Rostovshehikova, et al., "Mechanism of Catalytic Hydrochlorination of Ethane in the Solid Phase", Kinetics and Catalysts (1995) vol. 36(2), pp. 183-186.

Caplus Abstract No. 132:128257; Shilina, et al., "Application of Low Temperature IR Spectroscopy for Studies of Catalyst Properties and Dynamics on the Example of Aluminum Halide Complexes", Journal of Molecular Catalysis A: Chemical (1999) vol. 146(1-2), pp. 335-341.

* cited by examiner

BROMINATED STYRENIC POLYMERS AND THEIR PREPARATION

REFERENCE TO RELATED APPLICATIONS

This application claims the benefit and priority of U.S. Provisional Application Nos. 60/696,468, filed Jun. 30, 2005, and 60/790,431, filed Apr. 6, 2006, the disclosures of which are incorporated herein by reference.

TECHNICAL FIELD

This invention relates to brominated styrenic polymers with improved melt flow properties, such as improved melt flow and/or low color values, their preparation, and their use.

BACKGROUND

Commonly-owned U.S. Pat. Nos. 5,677,390, 5,686,538, 5,767,203, 5,852,131, 5,852,132, 5,916,978, 6,133,381, 6,207,765, 6,232,393, 6,232,408, 6,235,831, 6,235,844, 6,326,439, and 6,521,714 describe what is believed to be the best known prior process technology for producing brominated styrenic polymers such as brominated polystyrene having the best known properties of any previously-known brominated styrenic polymer. In this connection, the terms "brominated styrenic polymer" and "brominated polystyrene" as used in the specification and in the claims hereof refer to a brominated polymer produced by bromination of a pre-existing styrenic polymer such as polystyrene or a copolymer of styrene and at least one other vinyl aromatic monomer, as distinguished from an oligomer or polymer produced by oligomerization or polymerization of one or more brominated styrenic monomers, the properties of the latter oligomers or polymers typically being considerably different from brominated polystyrene in a number of respects.

Over the years considerable efforts have been made by various parties to improve upon the properties of brominated styrenic polymers, such as improved melt flow and/or low color values. Despite their best efforts, it appears that no party has been able to produce or provide a brominated styrenic polymer having the high melt flow values and/or low color values, much less the combination of excellent properties, of the brominated styrenic polymers producible and provided by this invention. Nor has a prior party found the processing relationships that make possible the production of such improved brominated styrenic polymers.

BRIEF SUMMARY OF THE INVENTION

It has now been discovered, inter alia, that in the aluminum halide catalyzed bromination of a styrenic polymer, reaction time has a profound influence on the type of product formed. More specifically, if the bromination reaction mixture is formed and exists for a very short period of time at a suitably low temperature and then the reaction is promptly terminated, a brominated styrenic polymer is formed having improved melt flow and/or color properties as compared to products produced in a reaction mixture that exists for a longer period of time, such as during a feed period of 30 minutes and a cook period of 5 minutes, the shortest residence times referred to in commonly-owned U.S. Pat. Nos. 6,113,381, 6,232,393, 6,232,408, 6,235,831, 6,235,844, and 6,521,714. This is an unexpected result because there is no corresponding change in molecular weight, and the respective products show very little difference in their excellent thermal stabilities (as exhibited for example by thermal HBr evolution at 320° C.) that could otherwise influence melt flow (measured at 220-270° C.). The bromination process embodiments of this invention can be applied to bromination of styrenic polymers produced by free radical polymerization, by anionic polymerization or by cationic polymerization, with use of styrenic polymers produced by free radical polymerization being preferred and use of styrenic polymers produced by anionic polymerization being more preferred.

The available experimental evidence indicates that in the aluminum halide catalyzed bromination of styrenic polymers, short reaction times result in the formation of kinetic bromination products, whereas a product formed in a reaction mixture that exists for longer periods of time is a thermodynamic product. Whatever the mechanism of this transformation, the available evidence indicates that the difference between the respective products is a difference in chemical structure. On comparing NMR spectra, brominated styrenic polymers produced by this invention have more hydrogen atoms in the ortho ring positions than do products formed from the same components in processes conducted under comparable reaction conditions, but involving longer feed times and use of cook periods. A plausible explanation for this difference is that by use of short reaction times, much of the bromine tends to occupy positions other than the ortho position(s). For instance, the 2,4,6- and 2,3,6-tribromo isomers are expected to be the least favored of the six possible tribromo isomers for products made with short reaction times, and the only tribromo having no ortho Br's 3,4,5-tribromo, may be most favored. High ortho bromination tends to introduce considerable steric strain on the polymer backbone which in turn can result in more extended chain conformations relative to the 3,4,5-tribromo isomer, for example. Such chain extension would increase melt viscosity thus causing the observed decrease in melt flow for the isomers having greater ortho bromination. Additional evidence in support of different bromination products being formed pursuant to this invention is a 2 to 10° C. decrease in glass transition temperature observed for products of this invention as compared to comparable products produced with longer reaction residence times.

Accordingly, one embodiment of this invention is a process of preparing brominated styrenic polymer, preferably using styrenic polymer formed by free radical polymerization, and more preferably by using styrenic polymer produced by anionic polymerization, which process comprises maintaining a reaction mixture formed from (i) a brominating agent, (ii) a solution of such styrenic polymer in a solvent, and (iii) aluminum halide catalyst in which the halogen atoms are bromine or chlorine with at least one such halogen atom being a bromine atom, at one or more temperatures in the range of −20 to +20° C. so that bromination of polymer occurs, and terminating the bromination of polymer in such reaction mixture in a bromination time of 20 minutes or less.

Another embodiment of this invention is a new brominated anionic styrenic polymer having (i) a bromine content of at least about 66 or 67 wt %, for example in the range of about 66-72 wt % and (ii) a higher melt flow index as compared to previously-known comparable brominated anionic styrenic polymers, as measured using ASTM Test Method D1238-00. The term "previously-known comparable brominated anionic styrenic polymers" is defined hereinafter. Although it is possible and within the scope of this invention to produce brominated styrenic polymers having 72 wt % of bromine, it is difficult to do so, and therefore the new brominated anionic styrenic polymers of this embodiment will usually have a bromine content of at least about 66 wt % but less than 72 wt %, e.g., in the range of about 66-71 wt %. More preferably these and other new brominated anionic styrenic polymers of this invention have bromine contents in the range of about 67-70 wt %.

Still another embodiment of this invention is brominated anionic styrenic polymer wherein said polymer has a bromine content of at least about 66 or 67 wt %, for example in the range of about 66-72 wt % and wherein said polymer is one in which the percentage of aromatic rings having ortho bromine atoms thereon as measured by proton NMR is less than the percentage of the aromatic rings having ortho bromine atoms thereon in previously-known comparable brominated anionic styrenic polymers. For the same reasons as given above, these new brominated anionic styrenic polymers of this embodiment will usually have a bromine content of at least 66 wt % but less than about 72 wt %, e.g., in the range of about 66-71 wt %. More preferably these new brominated anionic styrenic polymers of this embodiment have bromine contents in the range of about 67-70 wt %.

In addition to superior melt flow characteristics the novel brominated anionic styrenic polymers of this invention have other desirable properties. For example, a brominated anionic polystyrene of this invention was found to have an unusually low initial color ($\Delta E=0.18$) and excellent thermal stability (59 ppm HBr) as measured by the 320° C. Thermal Stability Test. Also, high bromine levels (e.g., 70 wt % bromine) can be obtained using process technology of this invention in reaction times as short as 8 minutes.

Apart from superior melt flow properties, this invention can also provide anionic styrenic polymers having extremely low initial Hunter Solution $\Delta E$ values, and preferably one or more additional highly desirable properties as well. As used herein, including the claims, the term "anionic styrenic polymer" or "anionic polystyrene" denotes that the polymer referred to has been produced by use of an anionic polymerization initiator, such as a lithium alkyl.

Accordingly another embodiment of this invention is brominated anionic styrenic polymer wherein said polymer has an initial Hunter Solution $\Delta E$ value in the range of above zero to 1.50, preferably in the range of 0.15 to 1.40, and even more preferably in the range of 0.18 to 1.32. Preferably, these brominated anionic styrenic polymers also have (1) a GPC weight average molecular weight (Mw) in the range of about 8,000 to about 50,000 (preferably in the range of about 10,000 to about 30,000), and more preferably in the range of about 10,000 to about 20,000; or (2) a thermal stability in the 320° C. Thermal Stability Test of 150 ppm of HBr or less (preferably 120 ppm of HBr or less); or (3) a bromine content of at least about 66 or 67 wt %, for example in the range of about 66-72 wt %, and as explained above, usually less than about 72 wt %, e.g., in the range of about 66-71 wt %, and more preferably in the range of about 67-70 wt %; or (4) a combination of any two, or all three, of (1), (2), (3).

Other features and embodiments of this invention will be still further apparent from the ensuing description and appended claims.

FURTHER DETAILED DESCRIPTION OF THE INVENTION

Process Technology

One embodiment of this invention is a process of preparing brominated styrenic polymer which can be conducted as a batch or semi-batch process, or as a continuous process. This process comprises maintaining a reaction mixture formed from (i) a brominating agent, (ii) a solution of styrenic polymer in a solvent, and (iii) aluminum halide catalyst in which each halogen atom is a chlorine or bromine atom with an average of at least one such halogen atom per molecule being a bromine atom, at one or more temperatures in the range of −20 to +20° C. so that bromination of polymer occurs, and terminating the bromination of polymer in such reaction mixture in a bromination time of 20 minutes or less, preferably 10 minutes or less, and more preferably 5 minutes or less. Usually the minimum bromination time is approximately 1 minute. In this connection, bromination time is time during which bromination can occur. For example, if, say, a continuous feed of (ii) is initiated followed 1 minute later by initiation of a continuous feed of (iii), followed 1 minute later by initiation of a continuous feed of (i), the bromination time starts with the initiation of the feed of (i) because in the prior two minutes bromination would not occur. In a more particular embodiment of this process, the brominating agent is bromine. It is preferred that at least 50 wt % of the styrenic polymer, more preferably at least 80 wt % of the styrenic polymer, used in forming the solution of styrenic polymer of (ii) above is polystyrene. Even more preferably polystyrene itself is used in forming the solution of (ii) above.

Components (i) and (ii) can be proportioned to produce brominated styrenic polymers containing any suitable quantity of bromine, which typically will be in the range from at least about 50 wt % up to a maximum of about 72 wt %. Thus, brominated styrenic polymers that can be produced by a process of this invention typically contain at least about 50 wt %, preferably at least about 60 wt %, more preferably at least about 67 wt %, and still more preferably in the range of about 68 to about 72 wt % of bromine. The manner of proportioning the styrenic polymer and the brominating agent to achieve various desired bromine contents are known to those of ordinary skill in this art and have been described in the commonly-owned patents referred to at the outset of this document. Thus anyone unfamiliar with the art desiring further details should consult the commonly-owned patents referred to at the outset. One of the highly advantageous features of this invention is that the process technology of this invention provides significantly improved properties in brominated anionic polystyrenes, even in the case of those having a bromine content as high as about 70 wt % or above.

There are various ways in which the processes of this invention can be carried out. One such method, which may be termed a batch or a semi-batch mode of operation involves rapidly introducing components (i), (ii), and (iii) into a reactor such as a stirred pot reactor so that the maximum time that any portion of the components are undergoing a bromination reaction does not exceed about 20 minutes. At about 20 minutes or less, the mixture in the stirred pot reactor is rapidly quenched either by introduction of a quenching composition into the reactor or by dumping the contents of the reactor into a quenching vessel containing the quenching composition. In this way, no portion of the reaction mixture undergoes bromination for more than about 20 minutes. So that the last portion of components fed to the reactor have sufficient time to undergo suitable bromination, it is desirable to stop the feeds and to allow a period of at least 1-2 minutes before terminating the bromination at or within the overall time of about 20 minutes or less from the initiation of the feeds of at least components (i), (ii), and (iii), to serve as a residual period of at least 1 to 2 minutes for the last portion of the components to undergo bromination. This batch or semi-batch mode of operation should involve rapid introduction of the components into the reactor and also sufficiently rapid agitation and efficient cooling of the reactor contents so that the reaction temperature is maintained within the above-specified temperature ranges and within a suitable bromination reaction time of no more than about 20 minutes.

A preferred mode of operation pursuant to this invention involves use of a continuous process. In one such preferred embodiment of this invention, there is provided a process of preparing brominated styrenic polymer, which process comprises:

A) causing reaction mixture continuously formed from components comprised of (i) a brominating agent, (ii) a solution of styrenic polymer in a solvent, and (iii) aluminum halide catalyst in which the halogen atoms are bromine or chlorine atoms and in which at least one such atom is a bromine atom, to continuously travel through and exit from a reaction zone maintained at one or more temperatures in the range of −20 to +20° C., and preferably in the range of 1 to 10° C., so that bromination of polymer occurs during at least a portion of such travel;

B) terminating bromination of polymer in the reaction mixture as or after reaction mixture exits from the reaction zone; and C) continuously having the time between formation of reaction mixture in A) and termination in B) in the range of 1 to 20 minutes, preferably in the range of 1 to 10 minutes, and more preferably in the range of 1 to 5 minutes.

In conducting this continuous process, preferably the reaction mixture as continuously formed in A) is comprised predominately or entirely of a liquid mixture, preferably the brominating agent is bromine, and preferably the bromine is continuously fed within the confines of the liquid reaction mixture being continuously formed. The term "confines" of course means within the body of the liquid reaction mixture as distinguished from feeding onto an exterior portion of the liquid reaction mixture. Feeding into the confines can be accomplished by use of an injector or feeding probe which extends into the body of the liquid reaction mixture being formed in the reaction zone so that the bromine is forced into the liquid as it leaves the injector or feeding probe. In a batch/semi-batch operation in a stirred pot type of reaction vessel it is desirable to position the exit portion of the injector or probe so that it is in close proximity to the periphery of the stirring blades so that the bromine is quickly dispersed within the body of the liquid reaction mixture being formed in the reaction zone.

In the continuous mode of operation the reaction mixture formed in A) from components (i), (ii), and (iii) can be formed in various ways. For example, the bromination reaction mixture can be formed by feeding (i), (ii), and (iii) continuously but separately from each other, into the reaction zone. Another way of forming the bromination reaction mixture involves feeding (ii) and a mixture of (i) and (iii) continuously into the reaction zone, with the feed of (ii) being separate from the feed of the mixture of (i) and (iii). Still another way of forming the bromination reaction mixture is to feed a mixture of (ii) and (iii) and a separate feed of (i) continuously into the reaction zone. It will be appreciated that there can be plural feed inlets to the reaction zone for one or more of (i), (ii), and (iii). Regardless of how many feed inlets are used and how the feeds are carried out (e.g., as three separate feeds or as two separate feeds, one of which is a combination of (i) and (iii) or of (ii) and (iii) and the other is (ii) or (i), respectively), the feeds should be substantially concurrent (except at start up when the feeds can be started at different times). Slight feed interruptions which cause no substantial imbalance in the operation can be tolerated but if possible, should be avoided or at least minimized so that steady state operation may be achieved. While it is preferred that all such feeds be continuous feeds, it is deemed possible to operate with one or more pulsed feeds having uniformly short time intervals between individual pulses. In each of the foregoing ways of carrying out the feeds in A), a separate concurrent continuous or discontinuous feed of solvent can be utilized as another feed stream in A), if desired. As in the case of the batch/semi-batch mode of operation, it is desirable to have the individual bromine feed(s) or the feed mixture(s)/solution(s) containing bromine to be fed directly into the confines of the liquid reaction mixture being formed in the reaction zone so that the bromine is rapidly dispersed within such liquid reaction mixture as it is being formed. Thus the reaction zone may be provided with a turbulent flow zone into which the individual bromine feed(s) or the feed mixture(s)/solution(s) containing bromine is/are injected into the body of a turbulent reaction mixture as it is being formed in the reaction zone.

A particularly preferred way of carrying out the above continuous process involves providing the bromination reaction zone with an upstream inlet zone and a downstream outlet zone; and conducting A) by continuously forming the reaction mixture by continuously feeding (i), (ii) and (iii), either separately or in combinations described above, into the upstream inlet zone. In this way, the reaction mixture is continuously produced in the reaction zone. Preferably such reaction mixture comprises a liquid phase in which bromination of styrenic polymer can occur, the continuous travel of the reaction mixture in A) is from the upstream inlet zone to the downstream outlet zone, and at least the average temperature of the liquid phase of the reaction mixture during such continuous travel is maintained at one or more temperatures in the range of −20 to +20° C., preferably in the range of 1 to 10° C., and more preferably in the range of 1 to 5° C. In addition, the exiting of the reaction mixture in A) from the reaction zone preferably is from the downstream outlet zone, and the reaction mixture as it exits from the reaction zone is passed into a quench zone in which the reaction mixture is quenched with a quenching composition comprised of water in the liquid state.

In conducting a continuous process of this invention, it is generally desirable to provide, maintain, and/or control the rate at which the reaction mixture exits from the reaction zone in A) in relation to the rate of the feeding of components (i), (ii), and (iii) such that the volume of the traveling contents of the reaction zone remains substantially constant. Thus, it is usually preferable to have continuous feeds to the reaction zone and continuous flows from the reaction zone, as this tends to make it easier to maintain an essentially constant volume in the reaction zone. However, it is possible to use pulsed feeds to the reaction zone or one or more pulsed streams exiting from the reaction zone while at the same time keeping the volume of the reaction mixture in the reaction zone substantially constant.

Termination of the bromination in B) of the continuous process is typically carried out by quenching reaction mixture that exits from the reaction zone with a quenching composition as or after such reaction mixture exits from the reaction zone. The quenching composition typically comprises water in the liquid state. The quenching step can be carried out either discontinuously or continuously. Discontinuous quenching involves collecting during a short period of time reaction mixture as it exits from the reaction zone and then promptly quenching that quantity in or with the quenching composition. Continuous quenching involves causing the reaction mixture as it continuously exits from the reaction zone to be quenched in or with the quenching composition.

The makeup of the aqueous quenching composition can vary considerably. Typically however, the quenching composition will comprise at least water in the liquid state. An aqueous solution of one or more suitable salts can also be used as a quenching composition. Non-limiting examples of salts which may be used in forming quenching compositions include sodium sulfite, sodium bisulfite, and sodium borohydride. Temperatures for the quenching composition can also vary, but typically will be in the range of 0 to 30° C. The concentration of the quenching composition comprised of one or more suitable salts in water is also susceptible to variation. In actual practice, 1% to 10% solutions of sodium sulfite in water have been found convenient for use as quenching compositions. However, other concentrations can be used. Use of water alone as the quenching composition is also possible.

Components Used as Feeds to the Reaction Zone

In both the batch/semi-batch mode of operation and the continuous mode of operation, various materials can be used as components (i), (ii), and (iii). For example, in all such modes of operation it is preferred to use elemental bromine as the brominating agent. The bromine should be of high purity. Methods for purifying bromine when and if necessary or desirable are described in many of the commonly-owned patents referred to at the outset of this document. However, other brominating agents can be used in the practice of this invention. Among known brominating agents that may be used are bromine chloride, N-bromosuccinimde, 1,3-dibromohydantoin, and pyridinium tribromide.

Styrenic polymers which are brominated to form brominated styrenic polymers using a process of this invention are homopolymers of styrene or copolymers of styrene with other vinyl aromatic monomers. Among suitable vinyl aromatic monomers from which the styrenic polymers can be formed are those having the formula:

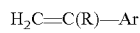

wherein R is a hydrogen atom or an alkyl group having from 1 to 4 carbon atoms and Ar is an aromatic group (including alkyl-ring substituted aromatic groups) of from 6 to 10 carbon atoms. Polystyrene itself is a preferred styrenic polymer, and anionic polystyrene is even more preferred as the styrenic polymer to be brominated. Use can be made however of other styrenic polymers such as those made from at least 50 weight percent, and more desirably at least 80 weight percent of styrene and/or alpha-methylstyrene with the balance being derived from ring substituted styrenic monomers. Thus, the "styrenic polymers" used in the practice of this invention are polymers of one or more styrenic monomers in which at least 50%, preferably at least 80%, and more preferably essentially 100% of the aromatic groups in the polymer have a hydrogen atom on at least one ortho position, and when the ring system of such aromatic groups is composed of a combination of phenyl groups and alkyl-substituted phenyl groups, at least 50%, preferably at least 80%, and more preferably essentially 100% of all such phenyl groups have a hydrogen atom on each ortho position.

Examples of suitable monomers for producing such styrenic polymers are styrene, alpha-methylstyrene, ortho-methylstyrene, meta-methylstyrene, para-methylstyrene, para-ethylstyrene, isopropenyltoluene, vinylnaphthalene, isopropenylnaphthalene, vinylbiphenyl, vinylanthracene, the dimethylstyrenes, and tert-butylstyrene.

The styrenic polymers used in the bromination processes of this invention are typically polymers made by cationic, by free radical, or by anionic polymerization procedures. An excellent process for producing anionic polystyrene is described in commonly-owned U.S. Pat. No. 6,657,028. Styrenic polymers made by free radical initiation are available in the marketplace. Among such styrenic polymers that are well suited for use in forming brominated styrenic polymers pursuant to this invention is Styron® 612 which is marketed by The Dow Chemical Company. However, additive-containing polystyrene such as Styron 668, Styron 677, Styron 680 of The Dow Chemical Company, as well as EA 3300, MB 3200, MC 3100, or EA 3000 of Chevron Chemical Company, or equivalent materials from other producers, can be used. Methods for producing cationic styrenic polymers are known and reported in the literature. As between styrenic polymers made by cationic polymerization and styrenic polymers made by free radical polymerization, the latter styrenic polymers are preferred. As between styrenic polymers made by free radical polymerization and styrenic polymers made by anionic polymerization, the anionic styrenic polymers are preferred.

Blends or mixtures of two or more styrenic polymers can also be brominated using a bromination process of this invention. Such blends or mixtures can be composed of two or more different styrenic polymers made by cationic polymerization, by free radical polymerization or by anionic polymerization. A blend or mixture of at least one styrenic polymer made by free radical polymerization and at least one styrenic polymer made by anionic polymerization can also be used as the polymer substrate to be brominated by a process of this invention.

Anionic styrenic polymers used as raw materials in making brominated styrenic polymers of this invention will usually have GPC weight average molecular weights in the range of about 2000 to about 20,000 Daltons, preferably in the range of about 3000 to about 10,000 Daltons, and more preferably in the range of about 3000 to about 7000 Daltons. Styrenic polymers formed by free radical polymerization used as raw materials in bromination processes of this invention desirably have GPC weight average molecular weights in the range of about 30,000 to about 500,000 Daltons, preferably in the range of about 50,000 to about 300,000 Daltons, and more preferably in the range of about 150,000 to about 300,000. Styrenic polymers formed by cationic polymerization used as raw material in bromination processes of this invention desirably have GPC weight average molecular weights in the range of about 2000 to about 20,000 Daltons, preferably in the range of about 3000 to about 10,000 Daltons, and more preferably in the range of about 3000 to about 7000 Daltons.

Any of a variety of suitable organic solvents can be used as the solvent for the styrenic polymer. Thus use can be made of such substances as, for example, dichloromethane, dibromomethane, bromochloromethane, bromotrichloromethane, chloroform, carbon tetrachloride, 1,2-dibromoethane, 1,1-dibromoethane, 1-bromo-2-chloroethane, 1,2-dichloroethane, 1,1,2-tribromoethane, 1,1,2,2-tetrabromoethane, 1,2-dibromopropane, 1-bromo-3-chloropropane, 1-bromobutane, 2-bromobutane, 2-bromo-2-methylpropane, 1-bromopentane, 1,5-dibromopentane, 1-bromo-2-methylbutane, 1-bromohexane, 1-bromoheptane, bromocyclohexane, and liquid isomers, homologs, or analogs thereof. Liquid mixtures of two or more such compounds can be used. Bromochloromethane is a particularly preferred solvent.

Styrenic polymer is predissolved in the solvent prior to use in forming the reaction mixture. The reaction zone in a batch or semi-batch operation should contain a suitable quantity of organic solvent prior to initiation of the feed of the components of the reaction mixture in order to suspend or dissolve the catalyst. In a continuous mode of operation, a separate stream of additional solvent can be fed into the reaction zone, if desired.

With anionic styrenic polymers having a GPC weight average molecular weight in the range of about 3000 to about 10,000, preferably the styrenic polymer solution used will contain in the range of 250 to 700 grams of styrenic polymer per kilogram of solvent. With anionic styrenic polymers of higher molecular weights the solutions should be more dilute to compensate for the increased viscosity of such polymer solutions.

As noted above, the catalyst as used in forming the reaction mixture is at least one aluminum halide catalyst in which the halogen atoms are bromine or chlorine atoms and in which at least one such atom is a bromine atom. One such catalyst which is very useful in forming the reaction mixture is aluminum tribromide because of its good solubility in bromine and halohydrocarbon solvents, such as dibromomethane and bromochloromethane. Aluminum halides containing both bromine atom(s) and chlorine atom(s) that may be used in forming the reaction mixture include such substances as aluminum bromide dichloride ($AlBrCl_2$, Reg. No. 60284-44-8), aluminum dibromide chloride ($AlBr_2Cl$, Reg. No. 60284-43-7), aluminum bromide chloride ($Al_2Br_5Cl$, Reg. No. 380907-74-4), and di-.mu.-bromotetrachlorodialuminum ($Al_2Br_2Cl_4$, Reg. No. 162719-12-2). In all of the embodiments of this invention, a preferred catalyst as fed to the reaction mixture is aluminum tribromide.

A catalyst solution suitable for either batch or continuous bromination can be easily prepared by combining solid $AlCl_3$ (a substance which is not soluble in bromine) and gaseous HBr in warm (40-50° C.) liquid bromine. A rapid halogen exchange produces a soluble bromoaluminum halide catalyst and HCl. Use of a catalyst of this type (with or without the copresence of HCl) is particularly preferred.

Brominated Anionic Styrenic Polymers of the Invention

Novel brominated anionic styrenic polymers can be produced by use of the process technology of this invention. New brominated anionic styrenic polymers of this invention have (i) higher melt flow indices as compared to previously-known comparable brominated anionic styrenic polymers and (ii) high bromine contents. They also have low chlorine contents (e.g., 500 ppm or less, and preferably 100 ppm or less) and thus are less corrosive to equipment in which they are processed, such as blenders and extruders.

Preferred new brominated anionic styrenic polymers of this invention have high bromine contents and also have lower percentages of aromatic rings with ortho-substituted bromine atoms as compared to previously-known comparable brominated anionic styrenic polymers. Typically the new brominated anionic styrenic polymers of this invention, especially those having a bromine content in the range of about 67 to about 71 wt %, have at least 5% less aromatic rings with ortho-substituted bromine atoms as compared to previously-known comparable brominated anionic styrenic polymers. Indeed, experiments have shown that brominated anionic polystyrenes of this invention having bromine contents in the range of 67 to 69 wt % can have at least 10% less aromatic rings with ortho-substituted bromine atoms as compared to previously-known comparable brominated anionic polystyrene.

More preferred new brominated anionic styrenic polymers of this invention also either have (A) a thermal stability in the 320° C. Thermal Stability Test of 300 ppm or less of HBr (still more preferably 200 ppm of HBr or less and even more preferably 125 ppm of HBr or less) or (B) an initial ΔE color value of 5 or less (still more preferably 3 or less). Still more preferred new brominated anionic styrenic polymers of this invention also have both of these (A) and (B) properties.

Novel brominated anionic styrenic polymers of this invention are preferably brominated anionic polystyrene polymers.

As used herein, including the claims, the term "previously-known comparable brominated anionic styrenic polymer(s)" denotes a brominated styrenic polymer that (1) is made from the same anionic styrenic polymer lot or made from an anionic styrenic polymer produced using the same kind of anionic polymerization initiator and the same kind of styrenic monomer composition (i.e., both brominated styrenic polymers being compared are formed by bromination of anionic styrenic polymer that was made using the same kind and quantity of anionic polymerization system, and both such styrenic polymers prior to bromination were made by polymerization of the same monomer such as styrene only, or if a styrenic copolymer, from the same styrenic monomers in the same proportions); (2) has a bromine content above 66 wt % that differs from the bromine content of the new brominated anionic styrenic polymer of this invention (which also has a bromine content above 66 wt %) by no more than 1.5 wt %; and (3) has a GPC weight average molecular weight that differs from the average GPC weight average molecular weight of the two brominated anionic styrenic polymers being compared by no more than 7.5%. In the foregoing, "previously-known" refers to information previously made known to the public as part of the prior art.

Desirably, the GPC weight average molecular weight of the brominated anionic styrenic polymers of this invention is in the range of about 8000 to about 50,000 Daltons, preferably in the range of about 10,000 to about 30,000 Daltons, and more preferably in the range of about 10,000 to about 20,000 Daltons.

These novel brominated anionic styrenic polymers possess new and useful properties, especially improved melt flow properties and in many cases superior initial color (typically measured as ΔE) and excellent thermal stability (typically measured by a standard thermal stability procedure described hereinafter). On comparing NMR spectra, brominated anionic polystyrene produced in accordance with this invention has more hydrogen atoms in the ortho ring positions than do products formed from the same components in processes conducted under comparable reaction conditions, but involving longer feed times and use of cook periods. Also, a 2 to 10° C. decrease in glass transition temperature observed for a brominated anionic polystyrene of this invention as compared to comparable products produced with longer reaction residence times serves as additional evidence that the brominated anionic styrenic polymers of this invention are in fact different from previously known anionic styrenic polymers. Thus the improved properties and analytical results both point to novel chemical structure in the brominated styrenic polymers of this invention, i.e., the bromine atoms in the brominated styrenic polymers of this invention tend to occupy positions other than the ortho position(s).

Whatever the mechanism, this invention provides as another embodiment brominated anionic styrenic polymer produced by a process of this invention wherein the brominated anionic styrenic polymer when heated to a temperature and pressure at which a measurable flow of liquid polymer occurs, has a higher melt flow than brominated anionic styrenic polymer produced in a batch process in which (a) the same quantities and proportions of (i), (ii) and (iii) are fed for 30 minutes to a reactor maintained at the same reaction temperature and (b) the reaction mixture then is held at the same temperature for a cook period of 5 minutes.

The new brominated anionic styrenic polymers of this invention are brominated anionic styrenic polymers with brominated anionic polystyrene being particularly preferred. Of the brominated styrenic polymers made using free radical polymerization or cationic polymerization, brominated polystyrenes made using free radical polymerization are preferred.

Another desirable property of brominated styrenic polymers produced by a bromination process of this invention—especially of the brominated anionic styrenic polymers of this invention such as brominated anionic polystyrene—is their high thermal stability in the 320° C. Thermal Stability Test as described hereinafter. Preferred brominated styrenic polymers, especially brominated anionic styrenic polymers such as brominated anionic polystyrene, have a thermal stability in that test of about 300 ppm of HBr or less and more preferred such polymers have a thermal stability in that test of about 200 ppm of HBr or less. Still more preferred brominated styrenic polymers of this invention, especially brominated anionic styrenic polymers such as brominated anionic polystyrene, are those having a thermal stability in the 320° C. Thermal Stability Test of 125 ppm of HBr or less.

Still another feature of brominated styrenic polymers produced by a process of this invention—especially brominated anionic styrenic polymers such as brominated anionic polystyrene—is their low color values as illustrated by the Hunter Solution Color Value Test described hereinafter. Preferred brominated styrenic polymers of this invention, especially brominated anionic styrenic polymers such as brominated anionic polystyrene, are those which have an initial ΔE color value by the Hunter test of 5 or less, and more preferably of 3 or less.

Especially preferred brominated styrenic polymers produced by a process of this invention—especially brominated anionic styrenic polymers such as brominated anionic polystyrene—possess not only the improved melt flow characteristics described above, but in addition have either a thermal stability in the 320° C. Thermal Stability Test or an initial ΔE Color Value as described in the immediately preceding two paragraphs. More especially preferred brominated styrenic polymers of this invention possess not only the improved melt flow characteristics described above, but in addition have both a thermal stability in the 320° C. Thermal Stability Test and an initial ΔE Color Value as described in the immediately preceding two paragraphs.

The brominated styrenic polymers that can be produced by the processes of this invention can contain any suitable amount of bromine. Typically they contain at least about 50 wt %, preferably at least about 60 wt %, and more preferably at least about 67 wt %. Bromine contents in the range of about 66 to about 71 wt %., and in the range of about 67 to about 70 wt % are also desirable. Another desirable range is about 68 to about 72 wt % of bromine.

Uses of Brominated Styrenic Polymers

The brominated styrenic polymers produced in accordance with this invention can be used as flame retardants for various polymeric materials such as thermoplastic and thermosetting polymeric materials and resins. The improved melt flow characteristics of the brominated anionic styrenic polymers of this invention enhances their usefulness for such applications. For example, their improved melt flow enables them to be melt blended more readily with thermoplastic polymers, and to be more readily applied to thermoset polymers or resins as coatings or as flame retardant binders. The weight average molecular weights of the substrate polymers that can be flame retarded pursuant to this invention can vary widely, from low molecular weight polymers to very high molecular weight polymers. Methods for producing the various thermoplastic or thermosetting polymers that can be flame retarded with the brominated styrenic polymers of this invention are known to those of ordinary skill in the art. Other persons who may be unfamiliar with such matters, should refer to the extensive literature that exists on such subjects.

Preferably the brominated styrenic polymers of this invention are used as additive flame retardants for various thermoplastic polymers. Thus among the embodiments of this invention are flame retardant compositions comprising at least one thermoplastic polymer and a flame retardant quantity of at least one brominated anionic styrenic polymer of this invention.

Particular thermoplastics with which the brominated anionic styrenic polymers of this invention can be blended pursuant to further embodiments of this invention include polyethylene terephthalate, polybutylene terephthalate, polycyclohexylene dimethylene terephthalate, polytrimethylene terephthalate, blends or mixtures of two or more of these, and analogous copolymeric thermoplastic polyesters, especially when filled or reinforced with a reinforcing filler such as glass fiber. Preferred thermoplastic polyesters are polyethylene terephthalate and polybutylene terephthalate. Polyamide thermoplastics, such as polyamide 6, polyamide 6,6, polyamide 12, etc., again preferably when glass filled, can also be effectively flame retarded in like manner. Other thermoplastic polymers that can be effectively flame retarded by addition of a brominated styrenic polymer of this invention include but are not limited to styrenic polymers, high impact polystyrenes, crystal polystyrenes, polyolefins, ABS, MABS, SAN, aromatic polycarbonates, polyphenylene ethers, and polymer blends such as aromatic polycarbonate-ABS blends, polyphenylene ether-polystyrene blends, and similar substances. One group of thermoplastic polymers which can be effectively flame retarded by use of at least one brominated anionic styrenic polymer of this invention is (1) a thermoplastic styrenic polymer, (2) a thermoplastic acrylonitrile-butadiene-styrene polymer, (3) a thermoplastic polyester, or (4) a thermoplastic polyamide. Conventional additives, such as flame retardant synergists, antioxidants, UV stabilizers, pigments, impact modifiers, fillers, acid scavengers, blowing agents, and the like, can be included with the formulations as is appropriate. Preferred polymer blends of this invention do contain a flame retardant synergist or glass fiber filler or reinforcement, and most preferably both a synergist, and a reinforcing fiber and/or filler.

The brominated styrenic polymer formed by a process of this invention—and especially brominated anionic styrenic polymers such as brominated anionic polystyrene of this invention—are used in flame retardant amounts, which typically are within the range of from about 5 to about 25 wt %, the wt % being based on the total weight of the thermoplastic polymer formulation or blend. When used, the amount of reinforcing fillers such as glass fiber will typically be in the range of up to about 50 wt % based on the total weight of the finished composition. The amount of flame retardant synergist, when used, such as antimony trioxide, antimony pentoxide, sodium antimonate, potassium antimonate, iron oxide, zinc borate, or analogous synergist generally will be in the range of up to about 12 wt % based on the total weight of the finished composition. Departures from the foregoing ranges of proportions are permissible whenever deemed necessary or desirable under the particular circumstances at hand, and such departures are within the scope and contemplation of this invention.

Masterbatch compositions wherein the components except for the substrate thermoplastic polymer are in suitable relative proportions but are blended in a smaller amount of the substrate polymer, are also within the scope of this invention.

Thus this invention includes compositions which comprise at least one thermoplastic polymer such as a polyalkylene terephthalate or a nylon polymer or a high impact polystyrene with which has been blended a brominated anionic styrenic polymer (preferably a brominated anionic polystyrene) of this invention in a weight ratio (substrate polymer:brominated anionic styrenic polymer or polystyrene) in the range of, say, 1:99 to 70:30. Such masterbatch blends need not, but may also contain filler or reinforcing fiber and/or at least one flame retardant synergist such as iron oxide, zinc borate, or preferably an antimony oxide synergist such as antimony trioxide, antimony pentoxide, sodium antimonate, or potassium antimonate. Typical examples of reinforcing agents or fillers that can be used include low-alkali E-glass, carbon fibers, potassium titanate fibers, glass spheres or microballoons, whiskers, talc, wollastonite, kaolin, chalk, calcined kaolin, and similar substances. Sizing agents can be used with such reinforcing agents or fillers, if desired. A number of suitable glass-filled polyalkylene terephthalates or nylon molding compositions are available on the open market, and these can be used in preparing the compositions of this invention.

Also provided by this invention are additive blends composed of a brominated anionic styrenic polymer of this invention and a synergist such as, for example, a blend of 75 parts by weight of a brominated anionic polystyrene and 25 parts by weight of a synergist such as antimony trioxide, antimony pentoxide, sodium antimonate, potassium antimonate, iron oxide, zinc borate, or analogous synergist. Typically such blends will contain in the range of about 70 to about 98 parts by weight of the brominated anionic polystyrene and about 30 to about 2 parts by weight of the synergist, with the total of the two components being 100 parts by weight. Suitable amounts of other suitable additive components can also be included in such additive blends.

Various known procedures can be used to prepare the blends or formulations constituting such additional compositions of this invention. For example the polyalkylene terephthalate polymer or a nylon polymer and the brominated styrenic polymer such as brominated polystyrene and any other components or ingredients to be incorporated into the finished blend can be blended together in powder form and thereafter molded by extrusion, compression, or injection molding. Likewise the components can be mixed together in a Banbury mixer, a Brabender mixer, a roll mill, a kneader, or other similar mixing device, and then formed into the desired form or configuration such as by extrusion followed by comminution into granules or pellets, or by other known methods.

Preferred thermoplastic compositions of this invention have the capability of forming molded specimens of 1.6 and 3.2 millimeter thickness (1/16 and 1/8-inch thickness) that pass at least the UL 94 V2 test.

Analytical Methods

Known analytical methods can be used or adapted for use in assaying the characteristics of the polymers of this invention. However, the following methods should be used for the sake of consistency.

Total Bromine Content. Since brominated styrenic polymers have good, or at least satisfactory, solubility in solvents such as tetrahydrofuran (THF), the determination of the total bromine content for the brominated styrenic polymers is easily accomplished by using conventional X-Ray Fluorescence techniques. The sample analyzed is a dilute sample, say 0.1±0.05 g brominated polystyrene in 60 mL THF. The XRF spectrometer can be a Phillips PW1480 Spectrometer. A standardized solution of bromobenzene in THF is used as the calibration standard. The total bromine values described herein and reported in the Examples are all based on the XRF analytical method.

Hunter Solution Color Value Test. To determine the color attributes of the brominated polymers of this invention, use is again made of the ability to dissolve brominated styrenic polymers in easy-to-obtain solvents, such as chlorobenzene. The analytical method used is quite straight-forward. Weigh 5 g±0.1 g of the brominated polystyrene into a 50 mL centrifuge tube. To the tube also add 45 g±0.1 g chlorobenzene. Close the tube and shake for 1 hour on a wrist action shaker. After the 1 hour shaking period, examine the solution for undissolved solids. If a haze is present, centrifuge the solution for 10 minutes at 4000 rpm. If the solution is still not clear, centrifuge an additional 10 minutes. Should the solution remain hazy, then it should be discarded as being incapable of accurate measurement. If, however, and this is the case most of the time, a clear solution is obtained, it is submitted for testing in a HunterLab Color Quest Sphere Spectrocolorimeter. A transmission cell having a 20-mm transmission length is used. The colorimeter is set to "Delta E-lab" to report color as $\Delta E$ and to give color values for "L", "a" and "b". Product color is determined as total color difference ($\Delta E$) using Hunter L, a, and b scales for the 10% by weight concentrations of the product in chlorobenzene versus chlorobenzene according to the formula:

$$\Delta E = [(\Delta L)^2 + (\Delta a)^2 + (\Delta b)^2]^{1/2}$$

DSC Values. DSC values were obtained with a TA Instruments DSC Model 2920. Samples were heated from 25° C. to 400° C. at 10° C./min under nitrogen.

Thermogravimetric Analysis. Thermogravimetric analysis (TGA) is also used to test the thermal behavior of the brominated styrenic polymers of this invention. The TGA values are obtained by use of a TA Instruments Thermogravimetric Analyzer. Each sample is heated on a Pt pan from 25° C. to about 600° C. at 10° C./min with a nitrogen flow of 50-60 mL/min.

320° C. Thermal Stability Test. To determine thermal stability and estimate the corrosive potential of a sample, the 320° C. Thermal Stability Test is used. The test procedure essentially as described in U.S. Pat. No. 5,637,650 except that the temperature used is 320° C. instead of 300° C. The reason for using such higher temperature is that the polymers of this invention do not involve measurable amounts of HBr at 300° C. Thus, in conducting this test, each sample is run in duplicate. A 2.00±0.01 g sample is placed into a new clean 20×150 mm test tube. With a neoprene stopper and Viton® fluoroelastomer tubing, the test tube is connected to a nitrogen purge line with exit gas from the test tube being passed successively through subsurface gas dispersion frits in three 250-mL sidearm filter flasks each containing 200 mL of 0.1 N NaOH and 5 drops of phenolphthalein. With a constant nitrogen purge at 0.5 SCFH, the test tube is heated to 320° C. in a molten salt bath (51.3% $KNO_3$/48.7% $NaNO_3$) for 15 minutes followed by 5 minutes at ambient temperature. The test tube containing the sample is then replaced with a clean dry test tube, and the apparatus is purged with nitrogen for an additional 10 minutes with the empty test tube in the 320° C. salt bath. The test tube, tubing and gas dispersion tubes are all rinsed with deionized water, and the rinse is combined quantitatively with the solutions in the three collection flasks. The combined solution is acidified with 1:1 $HNO_3$ and titrated with 0.01 N $AgNO_3$ using an automatic potentiometric titrator (Metrohm 670, 716, 736, or equivalent). Results are calculated as ppm HBr, ppm HCl, and ppm HBr equivalents as follows:

ppm HBr=(EP1)(N)(80912)/(sample wt.)

ppm HCl=(*EP2*−*EP1*)(*N*)(36461)/(sample wt.)

ppm HBr equivalents=(*EP2*)(*N*)(80912)/(sample wt.)

where EP(x)=mL of AgNO$_3$ used to reach end point x; and N=normality of AgNO$_3$. The tubing is thoroughly dried with nitrogen before the next analysis. Each day before the first sample, three empty clean test tubes are run as blanks to assure there is no residual hydrogen halide in the system.

NMR Analyses

Proton NMR spectra are acquired using a Bruker DPX 400 MHz instrument at a probe temperature of 120° C. for solutions of about 20 wt % brominated polystyrene in 1,1,2,2,-tetrachloroethane-d$_2$. After normal processing and base line corrections, the area of the broad peaks are integrated between 3.8 to 2.2 ppm and 2.2 to 0.9 ppm. The sum of these two areas, after correction for end groups and residual solvent, represents the three chain protons per polymer repeat unit. The area from 3.8 to 2.2 ppm represents the chain methine proton where the associated aromatic ring has at least one ortho-bromine atom. The percentage of polymer units having ortho ring bromination is determined from these integrals.

GPC Weight Average Molecular Weights

The M$_w$ values were obtained by GPC using a Waters model 510 HPLC pump and, as detectors, a Waters Refractive Index Detector, Model 410 and a Precision Detector Light Scattering Detector, Model PD2000. The columns were Waters, μStyragel, 500 Å, 10,000 Å and 100,000 Å. The autosampler was a Shimadzu, Model Sil 9A. A polystyrene standard (M$_w$=185,000) was routinely used to verify the accuracy of the light scattering data. The solvent used was tetrahydrofuran, HPLC grade. The test procedure used entailed dissolving 0.015-0.020 g of sample in 10 mL of THF. An aliquot of this solution is filtered and 50 μL is injected on the columns. The separation was analyzed using software provided by Precision Detectors for the PD 2000 Light Scattering Detector.

Melt Flow Index Test. To determine the melt flow index of the brominated styrenic polymers of this invention, the procedure and test equipment of ASTM Test Method D1238-00 are used. The extrusion plastometer is operated at 2.16 kg applied pressure and at a temperature selected from 220° C., 235° C., or 270° C. that provides measurable flow of the molten polymer sample being analyzed. The samples used in the tests are a brominated styrenic polymer of this invention or a sample of one or more previously-known comparable brominated styrenic polymers with which the polymer of this invention is being compared. All such tests are run using neat unadulterated samples of each of the respective polymers.

As used throughout this application, "APS" is used interchangeably with and meant to designate anionic polystyrene. The term "BrAPS" designates brominated anionic polystyrene. The term "M$_w$" means weight average molecular weight and the term "M$_n$" means number average molecular weight, both as determined by GPC (light scattering detector) described above. The term "CSTR" means continuous stirred tank reactor.

The following numbered Examples illustrate the practice of this invention and are not intended to limit the generic scope of this invention. Also presented for reference purposes are lettered Examples illustrating the preparation and properties of brominated styrenic polymers formed using the best previously-known process technology. It will be noted that the Reference Examples utilized relatively long reaction or residence times whereas pursuant to this invention the Examples of the invention involve use of relatively short reaction or residence times. Comparison of the results of these respective Examples thus illustrate some of the advantages provided by this invention.

REFERENCE EXAMPLE A

This batch bromination was carried out using an anionic polystyrene having a number average molecular weight of 2900 and a weight average molecular weight of 3400. A 2.46 g (18.5 mmol) portion of aluminum chloride (Aldrich) was suspended in 645.9 g of dry (>15 ppm water) BCM in a 1-L, 5-necked, jacketed, glass reaction flask cooled to −6° C. by a circulating glycol bath. The reaction flask having a flush-mount Teflon® polymer bottom valve was equipped with an overhead air stirrer and Teflon polymer banana-blade paddle, Friedrich's condenser (glycol cooled), and thermowell. A constant flow of dry nitrogen was maintained on the vent line from the condenser to assist in moving exit gases from the flask to a caustic scrubber. A 335.37 g portion of a 40.0 wt % solution (134.2 g APS, 1.29/n mol) of the anionic polystyrene in dry BCM was charged to a 500-mL graduated cylinder in a dry box. The graduated cylinder was then set up to pump the APS solution from the cylinder to a jacketed, glycol-cooled glass mixing tee mounted on the reaction flask. Bromine (555.7 g, 3.48 moles, 2.70 equivalents) was charged to a 250-mL graduated cylinder and set up to pump the bromine to the same mixing tee as the APS solution. Both streams were cooled separately by the mixer before combining at the bottom of the apparatus and dropping into the bromination flask. The reaction mixture was protected from photo-initiated aliphatic bromination by turning off hood lights and wrapping the flask and mixing tee with Al foil. Both feeds were started at the same time and were both completed in 80 min. A rinse of 102 g of dry BCM was used for the APS solution feed system to assure complete transfer of the polymer to the reaction flask while nitrogen was flushed through the bromine feed system to give quantitative transfer of the bromine. The reaction temperature was maintained at −2° C. to −4° C. throughout the addition and subsequent 15 min cook period (with nitrogen purge of the reactor overhead). The catalyst was deactivated by addition of 50 g of water. A 200 g portion of 10 wt % aqueous sodium sulfite was then added to assure the removal of any residual bromine. The organic phase was separated, and then washed with water (4×1 L) until neutral. The product was recovered from the organic phase by addition to vigorously stirred hot (98° C.) water. The solvent distilled from the hot water leaving a slurry of the brominated polystyrene product in water. After suction filtering, the white solid was rinsed with water (3×2 L) and dried to a constant weight of 399.2 g (97% yield) in an oven (123° C.) under a constant nitrogen purge. Product analyses appear in Table 1.

EXAMPLE 1

This continuous bromination was carried out using an anionic polystyrene having a number average molecular weight of 3200 and a weight average molecular weight of 3300 with three feed streams to the reactor. An 80-mL capacity glass CSTR was used for the run. The reactor had an outer insulating vacuum jacket and an inner jacket for circulating glycol coolant. The vessel had three inlet ports on the bottom for delivery of reagent solutions directly under the bottom turbine blade of the dual Teflon polymer turbine agitator (operated at 400 rpm). An overflow port located just above the top turbine blade allowed the reaction mixture to flow by gravity to a splitter that could direct the flow to the main product quench pot (5-L fully jacketed round bottom flask with paddle stirrer) or a secondary waste quench pot (2-L Erlenmeyer with magnetic stirrer). Exit gases from the CSTR passed overhead through a Friedrich's condenser and into an aqueous caustic scrubber with assistance from a constant nitrogen purge at the top of the condenser. During the bromination, the room and hood lights were turned off to minimize photobromination.

A single pump motor (Ismatec peristaltic pump, Cole-Parmer SY-78017-00) having two pump heads was used to deliver equal volumes of bromine and PS solutions to the CSTR using feed lines of Teflon polymer (⅛") and Viton fluoroelastomer (0.10", Cole-Parmer, SY-07605-46). A separate peristaltic pump (Masterflex 7550-90) was used to feed the $AlBr_3/CH_2Br_2$ solution using a feed line of Teflon polymer (⅛") and Viton fluoroelastomer (#14).

The concentrations of the BCM solutions of APS (30.0 wt %, d=1.545 g/mL) and bromine (72.1 wt %, d=2.660 g/mL) were chosen so that equal volumes would provide 2.7 equivalents of bromine for each aromatic ring in the APS. By using a single pump to transfer equal volumes of these two solutions to the reactor, pulsations of the two feed streams are matched and essentially no instantaneous change in stoichiometry is expected to occur during the operation of the CSTR. The standard insoluble $AlCl_3$ bromination catalyst used in the batch process was replaced by the soluble $AlBr_3$. A commercially available (Aldrich) 1.0 molar 10.58 wt % $AlBr_3$ solution of $AlBr_3$ in dibromomethane (DBM) was used. BCM can not be used in place of DBM for $AlBr_3$ dissolution due to halogen exchange that converts the soluble bromide to the insoluble chloride in a matter of several minutes at room temperature.

The operation was started by charging the CSTR with dry BCM (150.5 g) and 8 mL of the $AlBr_3$ solution. After cooling the contents of the CSTR to −9° C., the bromine and APS feeds were started (4.8 mL/min rate for each stream), and the $AlBr_3$ feed rate was adjusted to a pump setting of 0.35 ml/min. The CSTR temperature quickly rose to +1° C. and then slowly increased to reach +3° C. by the end of the operation. For the first 26 min, the overflow stream from the CSTR was directed to the waste quench pot (containing 850 g of 2 wt % aqueous $Na_2SO_3$). At this point, it was assumed a steady state condition (over 3 residence times) had been reached, so the overflow stream was diverted to the main quench pot (containing 1590 g of 2 wt % aqueous $Na_2SO_3$) to collect the steady state product until the PS solution was completely used (48 min). A small amount (41.0 g) of bromine solution remained unused. The weights of feed solutions used for the 74 min of operation were:

1) 30.0 wt % APS in BCM, 619.26 g (1.78 mol)
2) 72.1 wt % $Br_2$ in BCM, 1026.0 g, (4.63 mol), 2.60 equiv.
3) 10.6 wt % $AlBr_3$ in DBM, 84.9 g (0.0337 mol), 1.89 mol %

The white organic phase (934.7 g) in the main quench pot was separated from the aqueous phase, and combined in a 2-L separatory funnel with a BCM rinse (143.7 g) of the quench vessel. Three aqueous washes (900 g each) were used to remove residual acid and salts. The neutralized white organic phase was pumped into 5-L of vigorously stirred hot (98° C.) water to obtain a slurry of white finely divided solid in water. The slurry was suction filtered, and the solid was rinsed on the filter with water (3×2 L). The wet cake (588 g) was dried in a nitrogen purged oven at 122° C. to a constant weight of 389.8 g. Analytical results are summarized in Table 1.

REFERENCE EXAMPLE B

This batch bromination was carried out using an anionic polystyrene having a number average molecular weight of 2900 and a weight average molecular weight of 5700. A 2.75 g (20.6 mmol) portion of aluminum chloride (Aldrich) was suspended in 550.3 g of dry (>15 ppm water) BCM in a 1-L, 5-necked, jacketed, glass reaction flask cooled to −8° C. by a circulating glycol bath. The reaction flask having a flush-mount Teflon polymer bottom valve was equipped with an overhead air stirrer and Teflon polymer banana-blade paddle, Friedrich's condenser (glycol cooled), and thermowell. A constant flow of dry nitrogen was maintained on the vent line from the condenser to assist in moving exit gases from the flask to a caustic HBr scrubber. A 374.92 g portion of a 40.0 wt % solution (149.97 g APS, 1.44/n mol) of the anionic polystyrene in dry BCM was charged to a 500-mL graduated cylinder in a dry box. The graduated cylinder was then set up to pump the APS solution from the cylinder to a jacketed, glycol-cooled glass mixing tee mounted on the reaction flask. Bromine (621.6 g, 3.890 moles, 2.70 equivalents) was charged to a 250-mL graduated cylinder and set up to pump the bromine to the same mixing tee as the APS solution. Both streams were cooled separately by the mixer before combining at the bottom of the apparatus and dropping into the bromination flask. The reaction mixture was protected from photo-initiated aliphatic bromination by turning off hood lights and wrapping the flask and mixing tee with Al foil. Both feeds were started at the same time and were both completed in 72 min. A rinse of 112 g of dry BCM was used for the APS solution feed system to assure complete transfer of the polymer to the reaction flask while nitrogen was flushed through the bromine feed system to give quantitative transfer of the bromine. The reaction temperature was maintained at −3° C. to −5° C. throughout the addition and subsequent 15 min cook period (with nitrogen purge of the reactor overhead). The catalyst was deactivated by addition of 50 g of water. A 86.4 g portion of 10 wt % aqueous sodium sulfite was then added to assure the removal of any residual bromine. The organic phase was separated, and then washed with water (4×1 L) until neutral. The product was recovered from the organic phase by addition to vigorously stirred hot (98° C.) water. The solvent distilled from the hot water leaving a slurry of the brominated polystyrene product in water. After suction filtering, the white solid was rinsed with water (3×2 L) and dried to a constant weight of 443.8 g (96% yield) in an oven (118° C.) under a constant nitrogen purge. Product analyses appear in Table 1.

EXAMPLE 2

This continuous bromination was carried out as described in Example 1 using an anionic polystyrene having a number average molecular weight of 2900 and a weight average molecular weight of 5700. The operation was started by charging the CSTR with dry BCM (149.8 g) and 9 mL of the $AlBr_3$ solution. After cooling the contents of the CSTR to −12° C., the bromine and APS feeds were started (4.8 mL/min rate for each stream), and the $AlBr_3$ feed rate was adjusted to a pump setting of 0.21 ml/min. The CSTR temperature stayed between +1° C. and +3° C. during the reaction. For the first 25 min, the overflow stream from the CSTR was directed to the waste quench pot (containing 1034 g of 2 wt % aqueous $Na_2SO_3$). At this point, it was assumed a steady state condition (over 3 residence times) had been reached, so the overflow stream was diverted to the main quench pot (containing 1757 g of 2 wt % aqueous $Na_2SO_3$) to collect the steady state product until the APS solution was depleted (70 min). A small amount (66.6 g) of bromine solution remained unused. The weights of feed solutions used for the 95 min of operation were:

1) 30.0 wt % APS in BCM, 801.1 g (2.30 mol)
2) 72.3 wt % $Br_2$ in BCM, 1319.8 g, (5.97 mol), 2.60 equiv.
3) 10.6 wt % $AlBr_3$ in DBM, 82.6 g (0.0327 mol), 1.42 mol %

The white organic phase (1224.0 g) in the main quench pot was separated from the aqueous phase, and combined in a 2-L separatory funnel with a BCM rinse (205 g) of the quench vessel. Four aqueous washes were used to remove residual acid and salts. The neutralized white organic phase was pumped into 5-L of vigorously stirred hot (98° C.) water to obtain a slurry of white finely divided solid in water. The slurry was suction filtered, and the solid was rinsed on the filter with water (3×2 L). The wet cake (850 g) was dried in a nitrogen purged oven at 130° C. to a constant weight of 521.3 g. Analytical results are summarized in Table 1.

REFERENCE EXAMPLE C

This batch bromination was carried out as described in Reference Example B using an anionic polystyrene having a number average molecular weight of 3600 and a weight average molecular weight of 7500. Analytical results for the product are summarized in Table 1.

EXAMPLE 3

This continuous bromination was carried out as described in Example 1 using an anionic polystyrene having a number average molecular weight of 3600 and a weight average molecular weight of 7500. Analyses are summarized in Table 1.

TABLE 1

BATCH AND CONTINUOUS BROMINATION REACTIONS

| Example | Ref A | 1 | Ref B | 2 | Ref C | 3 |
|---|---|---|---|---|---|---|
| Bromination Process | Batch | Continuous | Batch | Continuous | Batch | Continuous |
| Catalyst | $AlCl_3$ | $AlBr_3$ | $AlCl_3$ | $AlBr_3$ | $AlCl_3$ | $AlBr_3$ |
| $AlX_3$, mole % | 1.43 | 1.89 | 1.43 | 1.42 | 1.45 | 1.45 |
| Maximum reaction Temp (° C.) | −1 | +4 | −3 | +3 | −4 | +2 |
| Total reaction time or ave. residence time (min) | 80 | 8 | 87 | 8 | 88 | 8 |
| APS feed concentration (wt %) | 40.0 | 30.0 | 40.0 | 30.0 | 38.9 | 30.0 |
| APS $M_n$ | 2900 | 3200 | 2900 | 2900 | 3600 | 3600 |
| APS $M_w$ | 3400 | 3300 | 5700 | 5700 | 7500 | 7500 |
| BrAPS Product Analyses | | | | | | |
| Wt % Br (XRF) | 68.9 | 67.4 | 68.8 | 68.4 | 69.1 | 69.0 |
| Thermal HBr, 320° C./15 min/$N_2$ (ppm) | 187 | 59 | 115 | 112 | 77 | 99 |
| Thermal color, (320° C./15 min/N2), 10 wt % in chlorobenzene | | | | | | |
| L | 93.46 | 95.29 | 95.41 | 95.34 | 95.04 | 94.36 |
| a | −2.31 | −2.69 | −3.59 | −2.55 | −5.12 | −2.85 |
| b | 19.11 | 17.17 | 16.04 | 15.21 | 22.91 | 16.81 |
| ΔE | 20.39 | 18.02 | 17.06 | 16.14 | 23.86 | 18.01 |
| Initial Color, 10 wt % in chlorobenzene | | | | | | |
| L | 99.34 | 99.84 | 99.92 | 99.50 | 99.72 | 99.73 |
| a | −0.53 | 0.38 | −0.51 | 0.24 | −0.21 | −0.04 |
| b | 2.59 | −0.13 | 2.27 | 1.07 | 1.63 | 1.83 |
| ΔE | 2.84 | 0.18 | 2.35 | 1.32 | 1.77 | 1.93 |
| DSC, $T_g$ (° C.) | 159.9 | 158.2 | 160.6 | 155.6 | 169.2 | 161.8 |
| TGA 1% wt loss temp, $N_2$ (° C.) | 351.1 | 343.7 | 349.6 | 350.7 | 359.0 | 350.8 |
| BrAPS GPC | | | | | | |
| $M_n$ | 12,100 | 12,400 | 13,200 | 13,000 | 18,200 | 15,300 |
| $M_w$ | 13,100 | 13,000 | 22,400 | 22,100 | 29,600 | 28,700 |
| % Aromatic rings with ortho-Br (NMR) | 77.8 | 67.4 | 82.4 | 68.0 | 81.6 | 70.8 |
| MFI (g/10 min, 220° C./2.61 kg) | 9.5 | 19.0 | 3.3 | 12.1 | 1.0 | 2.4 |

The brominated anionic polystyrenes of Example 1 and 2 are novel products of this invention having extremely low initial solution ΔE values. These brominated anionic polystyrenes also possess other highly desirable properties such as high bromine contents, high thermal stabilities in the 320° C. Thermal Stability Test, and GPC weight average and GPC number average weights in ranges which enable them to be readily blended with a wide variety of thermoplastic polymers. So far as is presently known, the lowest value initial solution ΔE value reported for a brominated anionic polystyrene is 1.74, and that polymer had a far inferior thermal stability in the Thermal Stability Test even though conducted at 300° C. rather than at 320° C. as in Examples 1 and 2 above, and a significantly higher GPC weight average molecular weight. See in this connection, U.S. Pat. No. 6,521,714, e.g., Column 33, lines 55-67, Column 34, lines 32-67, and Table VI, Example CE-6.

REFERENCE EXAMPLE D

This batch bromination was carried out as described in Reference Example A using an anionic polystyrene having a number average molecular weight of 3400 and a weight average molecular weight of 3800. A 1.22 g (9.15 mmol) portion of aluminum chloride was suspended in 499.1 g of dry (>15 ppm water) BCM in a 1-L, 5-necked, jacketed, glass reaction flask cooled to −5° C. by a circulating glycol bath. The reaction flask, having a flush-mount Teflon polymer bottom valve, was equipped with an overhead air stirrer and Teflon polymer banana-blade paddle, Friedrich's condenser (glycol cooled), and thermowell. A constant flow of dry nitrogen was maintained on the vent line from the condenser to assist in moving exit gases from the flask to a caustic scrubber for neutralization of the HBr by-product. A 315.0 g portion of a 40.5 wt % solution (127.6 g APS, 1.23/n mol) of anionic polystyrene in dry BCM was charged to a 250-mL graduated cylinder in a dry box. The graduated cylinder was then set up to pump the APS solution from the cylinder to a jacketed, glycol-cooled glass mixing tee mounted on the reaction flask. Bromine (529.3 g, 3.31 moles, 2.70 equivalents) was charged to a 250-mL graduated cylinder and set up to pump the bromine to the same mixing tee as the APS solution. Both streams were cooled separately by the mixer before combining at the bottom of the apparatus and dropping into the bromination flask. The reaction mixture was protected from photo-initiated aliphatic bromination by turning off hood lights and wrapping the flask and mixing tee with Al foil. Both feeds were started at the same time and were both completed in 60 min. The reaction temperature was maintained at −2° C. to 0° C. throughout the addition and subsequent 15 min cook period (with nitrogen purge of the reactor overhead). The catalyst was deactivated by addition of 40 g of water. A 19.2 g portion of 10 wt % aqueous sodium sulfite was then added to assure the removal of any residual bromine. The organic phase was separated, and then washed with water, dilute sodium hydroxide, and finally water to neutralize acid and remove NaBr. The product was recovered from the organic phase by addition to 4-L of vigorously stirred hot (98° C.) water. The solvent distilled from the hot water leaving a slurry of the brominated polystyrene product in water. After suction filtration of the slurry, the white solid was rinsed with water (3×2 L) and dried to a constant weight of 378.9 g (97% yield) in an oven (130° C.) under a constant nitrogen purge. Product analyses are given in Table 2.

REFERENCE EXAMPLE E

This batch bromination was carried out as described in Reference Example D using the same anionic polystyrene, but with a higher AlCl$_3$ level. Both the bromine and APS feeds were started at the same time and were both completed in 61 minutes. The reaction temperature was maintained at −2° C. to +1° C. throughout the addition and subsequent 15 min cook period (with nitrogen purge of the reactor overhead). The catalyst was deactivated by addition of 40 g of water. A 26.5 g portion of 10 wt % aqueous sodium sulfite was then added to assure the removal of any residual bromine. The organic phase was separated, and then washed with water, dilute sodium hydroxide, and finally water to neutralize acid and remove NaBr. The product was recovered from the organic phase by addition to vigorously stirred hot (98° C.) water. The solvent distilled from the hot water leaving a slurry of the brominated polystyrene product in water. After suction filtering, the white solid was rinsed with water (3×2 L) and dried to a constant weight of 382.5 g (98% yield) in an oven (130° C.) under a constant nitrogen purge. Product analyses are given in Table 2.

REFERENCE EXAMPLE F

This batch bromination was similar to Reference Example E using the same anionic polystyrene, but AlCl$_3$ was replaced with AlBr$_3$ catalyst and the reaction time was reduced from a total time of 75 min to 35 min. A 2.53 g (9.49 mmol) portion of aluminum bromide (Alfa) was suspended in 772.4 g of dry (>15 ppm water) BCM in a 1-L, 5-necked, jacketed, glass reaction flask cooled to −3° C. by a circulating glycol bath. The reaction flask, having a flush-mount Teflon polymer bottom valve, was equipped with an overhead air stirrer and Teflon polymer banana-blade paddle, Friedrich's condenser (glycol cooled), and thermowell. A constant flow of dry nitrogen was maintained on the vent line from the condenser to assist in moving exit gases from the flask to a caustic scrubber. A 174.3 g portion of a 40.5 wt % solution (70.6 g APS, 0.678/n mol) of anionic polystyrene in dry BCM was charged to a 250-mL graduated cylinder in a dry box. The graduated cylinder was then set up to pump the APS solution from the cylinder to a jacketed, glycol-cooled glass mixing tee mounted on the reaction flask. Bromine (289.9 g, 1.814 moles, 2.68 equivalents) was charged to a 200-mL graduated cylinder and set up to pump the bromine to the same mixing tee as the APS solution. Both streams were cooled separately by the mixer before combining at the bottom of the apparatus and dropping into the bromination flask. The reaction mixture was protected from photo-initiated aliphatic bromination by turning off hood lights and wrapping the flask and mixing tee with Al foil. Both feeds were started at the same time and were both completed in 30 min. A rinse of 100 g of dry BCM was used for the APS solution feed system to assure complete transfer of the polymer to the reaction flask while nitrogen was flushed through the bromine feed system to give quantitative transfer of the bromine. The reaction temperature was maintained at +1° C. to +3° C. throughout the addition and subsequent 5 min cook period (with nitrogen purge of the reactor overhead). The catalyst was deactivated by addition of 40 g of water. A 12.8 g portion of 10 wt % aqueous sodium sulfite was then added to assure the removal of any residual bromine. The organic phase was separated, and then washed with water, dilute sodium hydroxide, and finally water to neutralize acid and remove NaBr. The product was recovered from the organic phase by addition to vigorously stirred hot (98° C.) water. The solvent distilled from the hot water leaving a slurry of the brominated polystyrene product in water. After suction filtering the slurry, the white solid was rinsed with water (3×2 L) and dried to a constant weight of 205.4 g (96% yield) in an oven (130° C.) under a constant nitrogen purge. Product analyses are given in Table 2.

EXAMPLE 4

This continuous bromination used the same anionic polystyrene used in Reference Examples D, E, and F (number average molecular weight of 3400 and a weight average molecular weight of 3800) with only two feed streams to the reactor. The bromine stream, containing the dissolved AlBr$_3$ catalyst, and the APS solution in BCM were metered to the reactor using two separate pumps. An 80-mL capacity glass CSTR was used for the reaction. The reactor had an outer insulating vacuum jacket and an inner jacket for circulating glycol coolant. The vessel had two inlet ports on the bottom for delivery of reagent solutions directly under the bottom turbine blade of the dual Teflon polymer turbine agitator (operated at 400 rpm). An overflow port located just above the top turbine blade allowed the reaction mixture to flow by gravity to a splitter that could direct the flow to the main product quench pot (5-L fully jacketed round bottom flask with paddle stirrer) or a secondary waste quench pot (2-L Erlenmeyer with magnetic stirrer). Exit gases from the CSTR passed overhead through a Friedrich's condenser and into an aqueous caustic scrubber with assistance from a constant nitrogen purge at the top of the condenser. During the bromination, the room and hood lights were turned off to minimize photobromination.

Two identical pumps (Ismatec peristaltic pump, Cole-Parmer SY-78017-00) were used to deliver the bromine/AlBr$_3$ and APS/BCM solutions to the CSTR using feed lines of Teflon polymer (1/8") and Viton fluoroelastomer (0.10", Cole-Parmer, SY-07605-46). The operation was started by charging the CSTR with dry BCM (163.0 g) and cooling the contents of the reactor to −7° C. The bromine solution (2.29 g AlBr$_3$ in 525.0 g Br$_2$) and APS solution (127.5 g APS in 187.3 g BCM, 40.5 wt % APS) feeds to the reactor were started at the same time and both were held constant for the entire operation. The bromine feed rate was 2.87 ml/min and the APS feed rate was 3.62 ml/min. The CTSR temperature varied from 0° C. to +10° C. during the operation. For the first 25 min, the overflow stream from the CSTR was directed to the waste quench pot (containing 635 g of 4 wt % aqueous Na$_3$SO$_3$). After this point, the overflow stream was diverted to the main quench pot (containing 520 g of 4 wt % aqueous Na$_3$SO$_3$) to collect the steady state product. A small amount (10 g) of bromine solution remained unused when the APS solution was depleted after 60 min of operation. The weights of feed solutions used were:

1) 40.5 wt % APS in BCM, 314.8 g (224/n mol APS)
2) Br$_2$, 515 g (22 mol) 2.63 equiv.
3) 43 wt % AlBr$_3$ in Br$_2$ 2.25 g (0.0084 mol), 0.69 mol %

The average residence time for the reaction mass in the CSTR was 13 min. The organic phase in the main quench pot was diluted with BCM (288 g), and the lower organic phase was transferred to a 2-L separatory funnel. Two aqueous washes (900 g each) were used to remove residual acid and salts.

The neutralized organic phase was pumped into 4-L of vigorously stirred hot (98° C.) water to obtain a slurry of white finely divided solid in water. The slurry was suction filtered, and the solid was rinsed on the filter with water (3×2 L). The wet cake (89 g) was dried in a nitrogen purged oven at 130° C. to a constant weight of 45.7 g. Analytical results are summarized in Table 2.

TABLE 2

APS BROMINATION RESULTS

|  | Example | | | |
|---|---|---|---|---|
|  | Ref D | Ref E | Ref F | 4 |
| Bromination Process | Batch | Batch | Batch | Continuous |
| Catalyst | AlCl$_3$ | AlCl$_3$ | AlBr$_3$ | AlBr$_3$ |
| AlX$_3$, mole % | 0.75 | 1.43 | 1.41 | 0.69 |
| Maximum reaction Temp (° C.) | 0.00 | +1 | +3 | +10 |
| Total reaction time or ave. residence time (min) | 75 | 76 | 35 | 13 |
| APS feed concentration (wt %) | 40.5 | 40.5 | 40.5 | 40.5 |
| APS M$_n$ | 3400 | 3400 | 3400 | 3400 |
| APS M$_w$ | 3800 | 3800 | 3800 | 3800 |
| BrAPS Product Analyses |  |  |  |  |
| Wt % Br (XRF) | 68.1 | 67.3 | 67.9 | 67.0 |
| Thermal HBr, 320° C./15 min/N$_2$ (ppm) | 119 | 90 | 180 | 104 |
| Thermal color, (320° C./15 min/N$_2$), 10 wt % in chlorobenzene |  |  |  |  |
| L | 95.45 | 93.69 | 89.83 | 88.30 |
| a | −2.31 | −3.32 | −3.32 | −2.62 |
| b | 14.80 | 21.86 | 30.74 | 31.67 |
| ΔE | 15.70 | 22.99 | 32.58 | 33.88 |
| Initial Color, 10 wt % in chlorobenzene |  |  |  |  |
| L | 99.66 | 99.63 | 99.50 | 99.22 |
| a | −0.61 | −0.71 | −0.45 | −0.64 |
| b | 2.47 | 2.75 | 2.64 | 3.61 |
| ΔE | 2.63 | 2.92 | 2.81 | 3.82 |
| DSC, T$_g$ (° C.) | 166.0 | 167.4 | 168.6 | 162.6 |
| TGA 1% wt loss temp, N$_2$ (° C.) | 352.8 | 355.4 | 354.1 | 349.2 |
| BrAPS GPC |  |  |  |  |
| M$_n$ | 13,000 | 13,000 | 12,800 | 12,100 |
| M$_w$ | 13,500 | 13,200 | 13,200 | 12,400 |
| % Aromatic rings with ortho-Br (NMR) | 72.9 | 77.0 | 76.1 | 66.8 |
| MFI (g/10 min, 220° C./2.16 kg) | 5.7 | 5.3 | 5.2 | 12.1 |

REFERENCE EXAMPLE G

This batch bromination was carried out using an anionic polystyrene having a number average molecular weight of 3200 and a weight average molecular weight of 3300. The bromine charge was increased from 2.70 to 3.00 equivalents of bromine per aromatic ring. A 5.44 g (20.4 mmol) portion of aluminum bromide (Aldrich) was suspended in 199.8 g of dry (<15 ppm water) BCM in a 1-L, 5-necked, jacketed, glass reaction flask cooled to −4° C. by a circulating glycol bath. The reaction flask having a flush-mount Teflon polymer bottom valve was equipped with an overhead air stirrer and Teflon polymer banana-blade paddle, Friedrich's condenser (glycol cooled), and thermowell. A constant flow of dry nitrogen was maintained on the vent line from the condenser to assist in moving exit gases from the flask to a caustic scrubber. A 500.0 g portion of a 30.0 wt % solution (150.0 g APS, 1.44/n mol) of the anionic polystyrene in dry BCM was charged to a 500-mL graduated cylinder in a dry box. The graduated cylinder was then set up to pump the APS solution from the cylinder to a jacketed, glycol-cooled glass mixing tee mounted on the reaction flask. A solution of BCM (198.9 g) and bromine (690.4 g, 4.320 moles, 3.00 equivalents) was charged to a second 500-mL graduated cylinder and set up to pump the bromine to the same mixing tee as the APS solution. A single pump motor (Ismatec peristaltic pump, Cole-Parmer SY-78017-00) having two pump heads was used to deliver equal volumes of the APS and bromine solutions to the mixing tee. Both streams were cooled separately by the mixer before combining at the bottom of the apparatus and dropping into the bromination flask. The reaction mixture was protected from photo-initiated aliphatic bromination by turning off hood lights and wrapping the flask and mixing tee with Al foil. Both feeds were started at the same time and were both completed in 85 min. A rinse of 100 g of dry BCM was used for the APS solution feed system to assure complete transfer of the polymer to the reaction flask while nitrogen was flushed through the bromine feed system to give quantitative transfer of the bromine. The reaction temperature was maintained at −3° C. to 0° C. throughout the addition and subsequent 15 min cook period (with nitrogen purge of the reactor overhead). The catalyst was deactivated by addition of 8.7 g of water. The organic phase was separated, and then washed with water, dilute caustic, and finally water. The product was recovered from the organic phase by addition to vigorously stirred hot (98° C.) water. The solvent distilled from the hot water leaving a slurry of the brominated polystyrene product in water. After suction filtering, the white solid was rinsed with water (3×2 L) and dried to a constant weight of 471.9 g (95% yield) in an oven (120° C.) under a constant nitrogen purge. Product analyses appear in Table 3.

EXAMPLE 5

This continuous bromination was carried out as described in Example 1 using 3.00 equivalents bromine. The APS used was the same as used in Reference Example G. Product analyses are given in Table 3.

REFERENCE EXAMPLE H

This batch bromination was carried out using an anionic polystyrene having a number average molecular weight of 6200 and a weight average molecular weight of 6800 following the batch procedure described in Reference Example A except for an increase in the bromine charge to 3.00 equivalents. A 8.36 g (62.7 mmol) portion of aluminum chloride (Aldrich) was suspended in 799.1 g of dry (<15 ppm water) BCM in a 5-L, 5-necked, jacketed, glass reaction flask cooled to −3° C. by a circulating glycol bath. The reaction flask having a flush-mount Teflon polymer bottom valve was equipped with an overhead air stirrer and Teflon polymer banana-blade paddle, Friedrich's condenser (glycol cooled), and thermowell. A constant flow of dry nitrogen was maintained on the vent line from the condenser to assist in moving exit gases from the flask to a caustic scrubber. A 2093.7 g portion of a 20.0 wt % solution (418.7 g APS, 4.02/n mol) of the anionic polystyrene in dry BCM was charged to a 2-L flask in a dry box. The flask was then set up to pump the APS solution from the flask to a jacketed, glycol-cooled glass mixing tee mounted on the reaction flask. Bromine (1927.1 g, 12.06 moles, 3.00 equivalents) was charged to a second 2-L flask and set up to pump the bromine to the same mixing tee as the APS solution. Both streams were cooled separately by the mixer before combining at the bottom of the apparatus and dropping into the bromination flask. The reaction mixture was protected from photo-initiated aliphatic bromination by turning off hood lights and wrapping the flask and mixing tee with Al foil. Both feeds were started at the same time and were both completed in 196 min. A rinse of 103 g of dry BCM was used for the APS solution feed system to assure complete transfer of the polymer to the reaction flask while nitrogen was flushed through the bromine feed system to give quantitative transfer of the bromine. The reaction temperature was maintained at −3° C. to −1° C. throughout the addition and subsequent 15 min cook period (with nitrogen purge of the reactor overhead). The catalyst was deactivated by addition of 72 g of water. A 73.8 g portion of 10 wt % aqueous sodium sulfite was then added to assure the removal of any residual bromine. The organic phase was separated, and then washed with water, dilute caustic, and water. The product was recovered from the organic phase by addition to 6-L of vigorously stirred hot (98° C.) water in a 12-L pot. The solvent distilled from the hot water leaving a slurry of the brominated polystyrene product in water. After suction filtering, the white solid was rinsed with water (3×2 L) and dried to a constant weight of 1337.1 g (97% yield) in an oven (150° C.) under a constant nitrogen purge. Product analyses appear in Table 3.

EXAMPLE 6

This continuous bromination used the same anionic polystyrene used in Reference Example H (number average molecular weight of 6200 and a weight average molecular weight of 6800) with only two feed streams to the reactor. The bromine stream, containing the dissolved $AlBr_3$ catalyst, and the APS solution in BCM were metered to the reactor using two separate pumps An 80-mL capacity glass CSTR was used for the reaction. The reactor had an outer insulating vacuum jacket and an inner jacket for circulating glycol coolant. The vessel had two inlet ports on the bottom for delivery of reagent solutions directly under the bottom turbine blade of the dual Teflon polymer turbine agitator (operated at 400 rpm). An overflow port located just above the top turbine blade allowed the reaction mixture to flow by gravity to a splitter that could direct the flow to the main product quench pot (5-L fully jacketed round bottom flask with paddle stirrer) or a secondary waste quench pot (2-L Erlenmeyer with magnetic stirrer). Exit gases from the CSTR passed overhead through a Friedrich's condenser and into an aqueous caustic scrubber with assistance from a constant nitrogen purge at the top of the condenser. During the bromination, the room and hood lights were turned off to minimize photobromination.

Two identical pumps (Ismatec peristaltic pump, Cole-Parmer SY-780 17-00) were used to deliver the bromine/$AlBr_3$ and APS/BCM solutions to the CSTR using feed lines of Teflon polymer (⅛") and Viton fluoroelastomer (0.10", Cole-Parmer, SY-07605-46). The operation was started by charging the CSTR with dry BCM (170.2 g) and cooling the contents of the reactor to −5° C. The bromine solution (18.01 g AlBr$_3$ in 2070.9 g Br$_2$) and APS solution (450.58 g APS in 1802.3 g BCM, 20.0 wt % APS) feeds to the reactor were started at the same time and both were held constant for the entire operation. The bromine feed rate was 2.93 ml/min and the APS feed rate was 6.29 ml/min. The CSTR temperature varied from +3° C. to +7° C. during the operation. For the first 25 min, the overflow stream from the CSTR was directed to the waste quench pot (containing 468 g of 5 wt % aqueous Na$_2$SO$_3$). After this point, the overflow stream was diverted to the main quench pot (containing 607 g of 7 wt % aqueous Na$_2$SO$_3$) to collect the steady state product. A small amount (62.9 g) of bromine solution remained unused when the APS solution was depleted after 221 min of operation. The weights of feed solutions used were:

1) 20.0 wt % APS in BCM, 2252.9 g (4.326/n mol APS)

2) Br$_2$, 2008.0 g (12.57 mol), 2.90 equiv.

3) 0.86 wt % AlBr$_3$ in Br$_2$, 17.46 g (0.0655 mol), 1.51 mol %

The average residence time for the reaction mass in the CSTR was 9 min. The organic phase in the main quench pot was transferred to a 2-L separatory funnel and then diluted with a BCM rinse (538 g) of the quench pot. The diluted organic phase was then rinsed with water, dilute caustic, and finally water to remove residual acid and salts. The neutralized organic phase was pumped into 6-L of vigorously stirred hot (98° C.) water to obtain a slurry of white finely divided solid in water. The slurry was suction filtered, and the solid was rinsed on the filter with water (3×2 L). The wet cake (1702 g) was dried in a nitrogen purged oven at 130° C. to a constant weight of 1219.3 g. Analytical results for the product are summarized in Table 3.

TABLE 3

BATCH AND CONTINUOUS BROMINATION REACTIONS FOR HIGH BROMINE BrPS PRODUCTS

| | Example | | | |
|---|---|---|---|---|
| | Ref G | 5 | Ref H | 6 |
| Bromination Process | Batch | Continuous | Batch | Continuous |
| Catalyst | AlBr$_3$ | AlBr$_3$ | AlCl$_3$ | AlBr$_3$ |
| AlX$_3$, mole % | 1.42 | 1.22 | 1.56 | 1.51 |
| Maximum reaction Temp (° C.) | 0 | 5 | −1 | 7 |
| Total reaction time or ave. residence time (min) | 100 | 8 | 211 | 9 |
| APS feed concentration (wt %) | 30.0 | 30.0 | 20.0 | 20.0 |
| APS M$_n$ | 3200 | 3200 | 6100 | 6100 |
| APS M$_w$ | 3300 | 3300 | 6800 | 6800 |
| BrAPS Product Analyses | | | | |
| Wt % Br (XRF) | 70.3 | 69.9 | 70.1 | 69.4 |
| Thermal HBr, 320° C./15 min/N$_2$ (ppm) | 180 | 203 | 168 | 279 |
| Thermal color, (320° C./15 min/N$_2$), 10 wt % in chlorobenzene | | | | |
| L | 90.44 | 93.87 | 64.71 | 79.77 |
| a | −1.12 | −2.17 | 9.20 | 2.27 |
| b | 20.15 | 16.98 | 24.56 | 19.75 |
| ΔE | 22.49 | 18.26 | 44.35 | 28.76 |
| Initial Color, 10 wt % in chlorobenzene | | | | |
| L | 99.60 | 100.08 | 95.95 | 99.40 |
| a | −1.29 | −0.47 | −1.72 | −0.84 |
| b | 4.19 | 1.69 | 11.29 | 3.64 |
| ΔE | 4.37 | 1.74 | 12.23 | 3.78 |
| DSC, T$_g$ (° C.) | 174.2 | 170.8 | 184.1 | 178.7 |
| TGA 1% wt loss temp, N$_2$ (° C.) | 356.4 | 353.2 | 361.9 | 357.5 |
| BrPS GPC | | | | |
| M$_n$ | 11,000 | 12,900 | 21,400 | 23,800 |
| M$_w$ | 13,500 | 13,200 | 26,100 | 24,000 |
| % Aromatic rings with ortho-Br (NMR) | 90.7 | 84.3 | 85.3 | 78.8 |
| MFI (g/10 min, 235° C./2.16 kg) | 9.5 | 20.5 | — | — |
| MFI (g/10 min, 270° C./2.16 kg) | — | — | 47.2 | 96.7 |

Table 4 summarizes the results of evaluation of glass filled nylon 6,6 polymer blends containing various brominated flame retardants. The flame retardants used were Saytex® HP-3010 polymer (brominated polystyrene; Albemarle Corporation), Great Lakes PDBS-80™, and samples of brominated polystyrenes of this invention from Examples 5 and 6, and samples of brominated polystyrenes Reference Examples G and H.

TABLE 4

| BrPS Sample | Commercial | Commercial PDBS-80 | Ex. 5 | Ref. G | Ex. 6 | Ref. H |
|---|---|---|---|---|---|---|
| Parts Zytel ® 70G43L polymer (43% glass) | 69.9 | 69.9 | 70.0 | 70.0 | 70.0 | 70.0 |
| Parts Zytel 101 polymer | 2.8 | 0.4 | 3.2 | 3.2 | 3.2 | 3.2 |
| Parts Saytex ® 3010, 68.0% | 20.7 | — | — | — | — | — |
| Parts PDBS-80 ™ Fire | — | 23.1 | — | — | — | — |
| Parts BrPS 3300 Mw APS, 69.9% Br (continuous Br) | — | — | 20.2 | — | — | — |
| Parts BrPS 3300 Mw APS, 70.3% Br (batch Br) | — | — | — | 20.2 | — | — |
| Parts BrPS 6800 Mw APS, 69.4% Br (continuous Br) | — | — | — | — | 20.2 | — |
| Parts BrPS 6800 Mw APS, 70.1% Br (batch Br) | — | — | — | — | — | 20.2 |
| Parts Antimony Trioxide | 6.2 | 6.2 | 6.2 | 6.2 | 6.2 | 6.2 |
| Parts PTFE Teflon ® | 0.4 | 0.4 | 0.4 | 0.4 | 0.4 | 0.4 |
| TESTING RESULTS | | | | | | |
| UL-94 @ 1/16" | V-0 | V-0 | V-0 | V-0 | V-0 | V-0 |
| Burn Time T1 | 25.5 | 18.9 | 21.0 | 24.6 | 37.3 | 16.6 |
| Burn Time T1 + T2 | 30.4 | 23.0 | 25.4 | 30.1 | 45.5 | 24.8 |
| Drip | No | No | No | No | No | No |
| Melt Viscosity @ 250° C., 7300 1/sec; Pa* sec | 49 | 45 | — | — | 59 | 61 |
| Melt Viscosity @ 265° C., 7300 1/sec; Pa* sec | 44 | 43 | 44 | 49 | — | — |
| Notched Izod, ft-lb | 1.5 | 1.3 | 1.8 | 1.8 | 1.7 | 1.6 |
| Tensile @ Break, kpsi | 19.0 | 17.7 | 20.8 | 20.9 | 19.3 | 19.4 |
| Elongation @ Break, % | 2.9 | 2.7 | 3.3 | 3.6 | 3.2 | 3.3 |

From the foregoing it can be seen that this invention includes various additional embodiments such as for example:

I) A process of preparing a brominated styrenic polymer having increased melt flow properties measurable by use of ASTM Test Method D1238-00, which process comprises:

A) continuously forming reaction mixture from (i) a brominating agent, (ii) a solution of styrenic polymer in a solvent, and (iii) aluminum halide catalyst in which the halogen atoms are bromine or chlorine with at least one such halogen atom being a bromine atom;

B) causing said reaction mixture to continuously travel through and exit from a reaction zone maintained at one or more temperatures in the range of about −20 to about +20° C. (preferably in the range of about 1 to about 10° C. and more preferably in the range of about 1 to about 5° C.), so that bromination of polymer occurs during at least a portion of such travel;

C) terminating bromination of polymer in the reaction mixture as or after reaction mixture exits from the reaction zone; and D) continuously having the time between formation of reaction mixture in A) and termination in C) in the range of 20 minutes or less (preferably 10 minutes or less and more preferably 5 minutes or less).

II) A process of preparing a brominated styrenic polymer product having increased melt flow properties at 235° C. and 2.16 kg or at 270° C. and 2.16 kg in the melt flow index test, which process comprises:

A) continuously forming in, and continuously withdrawing from, a reaction zone maintained at one or more temperatures in the range of about −20° C. to about +20° C. (preferably in the range of about 1 to about 10° C. and more preferably in the range of about 1 to about 5° C.), a bromination reaction mixture formed from (i) a brominating agent, (ii) a solution of styrenic polymer in a solvent, and (iii) aluminum halide catalyst in which the halogen atoms are bromine or chlorine with at least one such halogen atom being a bromine atom;

B) providing reaction mixture in the reaction zone a residence time for bromination of polymer to occur, such residence time being in the range of no more than about 20 minutes (preferably 10 minutes or less and more preferably 5 minutes or less) between formation and withdrawal of reaction mixture; and C) terminating bromination of polymer in withdrawn reaction mixture within 10 minutes (preferably within 5 minutes) after withdrawal, the total time of B) and C) being no more than about 20 minutes.

III) A process as in I) or II) wherein bromination of polymer is terminated in C) by quenching withdrawn reaction mixture with a quenching composition comprising water in the liquid state.

As used anywhere herein, including the claims, the terms "continuous" and "continuously" denote that the operation referred to ordinarily proceeds without interruption in time provided however that an interruption is permissible if of a duration that does not disrupt steady-state conditions of that operation. If the interruption is of a duration that disrupts steady-state operation, a steady state condition of operation should be achieved before resuming collection of the product.

It is to be understood that the components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what preliminary chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with the application of common sense and the ordinary skill of a chemist, is thus wholly immaterial for an accurate understanding and appreciation of the true meaning and substance of this disclosure and the claims thereof.

Each and every patent or publication referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

The invention claimed is:

1. A process of preparing brominated anionic styrenic polymer, which process is conducted as a continuous process and which process comprises maintaining in a reaction zone, reaction mixture continuously formed from (i) a brominating agent, (ii) a solution of anionic styrenic polymer in a solvent, and (iii) aluminum halide catalyst in which the halogen atoms are bromine or chlorine with at least one such halogen atom being a bromine atom, in which (i), (ii), and (iii) are fed as at least two separate feeds in which (i) and (ii) are not fed as a mixture, at one or more temperatures in the range of −20 to +20° C., said mixture being continuously proportioned so that bromination of polymer occurs to form a brominated anionic styrenic polymer having a bromine content of at least about 60 wt %, and terminating the bromination of polymer in reaction mixture continuously exiting from the reaction zone in a bromination time of 20 minutes or less, and wherein the brominated anionic styrenic polymer formed in the process has an initial Hunter solution ΔE Color Value of 3 or less.

2. A process as in claim 1 wherein (i) is bromine.

3. A process as in claim 1 wherein the anionic styrenic polymer used in forming (ii) is anionic polystyrene.

4. A process as in claim 1 wherein (i) is bromine and wherein at least 50 wt % of the anionic styrenic polymer used in forming (ii) is made from styrene.

5. A process as in claim 2 wherein the styrenic polymer used in forming said brominated styrenic polymer is anionic polystyrene wherein said reaction mixture is proportioned so that the brominated polystyrene formed in the process has a bromine content of at least about 66 wt %, and wherein the weight average molecular weight of the anionic polystyrene used in forming said solution of (ii) results in the brominated polystyrene formed in the process having a GPC weight average molecular weight in the range of about 8000 to about 50,000.

6. A process as in claim 1 wherein (i) is bromine and wherein the anionic styrenic polymer used in forming (ii) is anionic polystyrene.

7. A process as in claim 2 wherein the styrenic polymer used in forming said brominated styrenic polymer is anionic polystyrene, wherein said reaction mixture is proportioned so that the brominated polystyrene formed in the process has a bromine content of at least about 66 wt %, and wherein the weight average molecular weight of the anionic polystyrene used in forming said solution of (ii) results in the brominated polystyrene formed in the process having a GPC weight average molecular weight in the range of about 10,000 to about 20,000, and wherein the brominated polystyrene formed in the process has an initial Hunter solution ΔE Color Value of 3 or less.

8. A process as in claim 1 wherein (iii) is comprised of aluminum tribromide and the solvent is comprised of bromochloromethane.

9. A process as in any of claims 1-8 wherein said bromination time is 10 minutes or less.

10. A process as in any of claims 1-8 wherein said bromination time is 5 minutes or less.

11. A process of preparing brominated anionic styrenic polymer, which process comprises:
   A) causing reaction mixture continuously formed from (i) a brominating agent, (ii) a solution of anionic styrenic polymer in a solvent, and (iii) aluminum halide catalyst in which the halogen atoms are bromine or chlorine with at least one such halogen atom being a bromine atom, in which (i), (ii), and (iii) are fed as at least two separate feeds in which (i) and (ii) are not fed as a mixture, to continuously travel through and exit from a reaction zone maintained at one or more temperatures in the range of −20 to +20EC so that bromination of polymer occurs during at least a portion of such travel, said reaction mixture being continuously proportioned to form a brominated anionic styrenic polymer having a bromine content of at least about 60 wt %;
   B) terminating bromination of polymer in the reaction mixture as or after reaction mixture exits from the reaction zone; and
   C) continuously having the time between formation of reaction mixture in A) and termination in B) in the range of 20 minutes or less, wherein the brominated anionic styrenic polymer formed in the process has an initial Hunter solution ΔE Color Value of 3 or less.

12. A process as in claim 11 wherein the termination of bromination of polymer in B) is carried out by quenching reaction mixture that continuously exits from the reaction zone with a quenching composition as or after such reaction mixture exits from the reaction zone, said quenching composition comprising water in the liquid state.

13. A process as in claim 12 wherein the quenching is conducted by discontinuously quenching the reaction mixture that continuously exits from the reaction zone.

14. A process as in claim 12 wherein the quenching is conducted continuously.

15. A process as in claim 11 wherein (i) is bromine.

16. A process as in claim 15 wherein the reaction mixture as continuously formed in A) is comprised predominately or entirely of a liquid mixture, and wherein the bromine is continuously fed within the confines of such liquid.

17. A process as in claim 16 wherein (iii) is comprised of aluminum tribromide and wherein the solvent is comprised of bromochloromethane.

18. A process as in any of claims 11-17 wherein said bromination reaction mixture is formed by feeding (i) and (ii) continuously but separately from each other, into the reaction zone, and feeding (iii) as a separate continuous feed and/or as a pulsating feed with time intervals between pulses.

19. A process as in any of claims 11-17 wherein said bromination reaction mixture is formed by feeding (ii) and a mixture of (i) and (iii) continuously into the reaction zone, with the feed of (ii) being separate from the feed of the mixture of (i) and (iii).

20. A process as in any of claims 11-17 wherein the styrenic polymer in (ii) is anionic polystyrene.

21. A process as in any of claims 11-17 wherein said time in C) is in the range of 10 minutes or less.

22. A process as in claim 21 wherein said time in C) is in the range of 5 minutes or less.

23. A process as in claim 11 wherein said reaction zone has an upstream inlet zone and a downstream outlet zone; wherein in A) the reaction mixture is continuously formed by continuously feeding (i), (ii) and (iii) into said upstream inlet zone to continuously produce said reaction mixture in the reaction zone; wherein said reaction mixture comprises a liquid phase in which bromination of anionic styrenic polymer can occur; wherein the continuous travel of said reaction mixture in A) is from said upstream inlet zone to said downstream outlet zone and at least the average temperature of the liquid phase of the reaction mixture during said continuous travel is maintained at said one or more temperatures in the range of −20 to +20EC; wherein the exiting of the reaction mixture in A) from the reaction zone is from said downstream outlet zone; and wherein the reaction mixture as it exits from the reaction zone is passed into a quench zone in which the reaction mixture is quenched with a quenching composition comprised of water in the liquid state.

24. A process as in claim 23 wherein the rate of exiting of reaction mixture from the reaction zone in A) in relation to the rate of continuous feeding in A) are maintained such that the volume of the traveling contents of the reaction zone remains substantially constant.

25. A process as in claim 23 wherein (i) is bromine and (iii) is comprised of aluminum tribromide; wherein said continuous feeding of (i), (ii) and (iii) is conducted by feeding (ii) and a mixture of (i) and (iii) continuously into the reaction zone, with the feed of (ii) being separate from the feed of the mixture of (i) and (iii); and wherein said one or more temperatures are maintained in the range of 1 to 10EC.

26. A process as in claim 25 wherein the styrenic polymer in (ii) is anionic polystyrene.

27. A process as in claim 1 or 11 wherein said reaction mixture is proportioned so that said polymer has a bromine content of at least about 67 wt %.

28. A process as in any of claims 1-4, 6, 8, 11-17, or 23-26 wherein said reaction mixture is proportioned so that said polymer has a bromine content in the range of about 67 to about 71 wt %.

\* \* \* \* \*

UNITED STATES PATENT AND TRADEMARK OFFICE
CERTIFICATE OF CORRECTION

PATENT NO. : 7,632,893 B2  Page 1 of 1
APPLICATION NO. : 11/453542
DATED : December 15, 2009
INVENTOR(S) : Charles H. Kolich, Jeffrey Todd Aplin and John F. Balhoff It is certified that error appears in the above-identified patent and that said Letters Patent is hereby corrected as shown below:

Column 32, Claim 11, line 28, reads "-20 to +20EC" and should read -- -20 to +20°C--.

Column 33, Claim 23, line 22, reads "-20 to +20EC" and should read -- -20 to +20°C--.

Column 34, Claim 25, line 14, reads "1 to 10EC" and should read --1 to 10°C--.

Signed and Sealed this
First Day of May, 2012

David J. Kappos
*Director of the United States Patent and Trademark Office*